(12) United States Patent
Miklós et al.

(10) Patent No.: US 12,225,417 B2
(45) Date of Patent: Feb. 11, 2025

(54) COORDINATED CHANGE OF PROTOCOL DATA UNIT SESSION ANCHORS

(71) Applicant: Telefonaktiebolaget LM Ericsson (publ), Stockholm (SE)

(72) Inventors: György Miklós, Pilisborosjenö (HU); Balázs Varga, Budapest (HU); János Farkas, Kecskemét (HU); János Harmatos, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 382 days.

(21) Appl. No.: 17/769,498

(22) PCT Filed: Oct. 22, 2019

(86) PCT No.: PCT/IB2019/059034
§ 371 (c)(1),
(2) Date: Apr. 15, 2022

(87) PCT Pub. No.: WO2021/079171
PCT Pub. Date: Apr. 29, 2021

(65) Prior Publication Data
US 2023/0156531 A1    May 18, 2023

(51) Int. Cl.
*H04W 36/00* (2009.01)
(52) U.S. Cl.
CPC .... *H04W 36/0027* (2013.01); *H04W 36/0011* (2013.01)
(58) Field of Classification Search
CPC .............................................. H04W 36/00–385
See application file for complete search history.

(56) References Cited

U.S. PATENT DOCUMENTS 10,575,220 B2 * 2/2020 Lee .................. H04W 36/12
12,041,493 B2 * 7/2024 Kim ............... H04W 36/00695
(Continued)

FOREIGN PATENT DOCUMENTS

WO    2017137075 A1    8/2017
WO    2018207001 A1    11/2018
(Continued)

OTHER PUBLICATIONS

PCT International Search Report and Written Opinion mailed Jun. 29, 2020 for International Application No. PCT/IB2019/059034, 18 pages.
(Continued)

*Primary Examiner* — Brendan Y Higa
(74) *Attorney, Agent, or Firm* — Sage Patent Group

(57) ABSTRACT

Methods and systems for coordinated change of Protocol Data Unit (PDU) Session Anchors (PSAs) are provided. According to one embodiment, a method for coordinated change of PSAs comprises, at a node for maintaining PSA change status for PDU sessions, receiving a request for a PSA change or handover for a first PDU session having a first PSA, where the first PDU session and a second PDU session having a second PSA different from the first PSA are redundant PDU sessions with each other. If the second PDU session is undergoing a PSA change or handover, the request to change the first PDU session is denied; otherwise, the request to change the first PDU session is granted, and the second PDU session will not be allowed to be changed until the PSA change or handover for the first PDU session is complete.

20 Claims, 19 Drawing Sheets

(56) References Cited

U.S. PATENT DOCUMENTS

| | | | |
|---|---|---|---|
| 2018/0199398 A1 | 7/2018 | Dao et al. | |
| 2019/0007500 A1* | 1/2019 | Kim | H04L 67/141 |
| 2020/0128450 A1* | 4/2020 | Wang | H04W 4/02 |
| 2021/0227597 A1* | 7/2021 | Kawasaki | H04W 76/18 |
| 2021/0251020 A1* | 8/2021 | Aramoto | H04W 76/25 |
| 2022/0007444 A1* | 1/2022 | Kawasaki | H04W 76/34 |
| 2022/0053390 A1* | 2/2022 | Kim | H04W 36/00695 |
| 2022/0360977 A1* | 11/2022 | Kim | H04L 65/80 |
| 2023/0007715 A1* | 1/2023 | Miklos et al. | H04W 76/25 |

FOREIGN PATENT DOCUMENTS

| | | |
|---|---|---|
| WO | 2019011434 A1 | 1/2019 |
| WO | 2019130048 A1 | 7/2019 |
| WO | 2019243901 A1 | 12/2019 |

OTHER PUBLICATIONS

3GPP, 3GPP TR 23.725, Technical Specification Group Services and System Aspects, "Study on Enhancement of Ultra-Reliable Low-Latency Communication (URLLC) Support in the 5G Core Network (5GC)", (Release 16), V16.2.0 (Jun. 2019), Valbonne, France, 93 pages, XP051753965.

3GPP, 3GPP TS 23.502, Technical Specification Group Services and System Aspects, "Procedures for the 5G System", Stage 2, (Release 15), V0.4.0 (May 2017), Valbonne, France, 126 pages, XP051298344.

3GPP, 3GPP TR 23.725, Technical Specification Group Services and System Aspects, "Study on Enhancement of Ultra-Reliable Low-Latency Communication (URLLC) Support in the 5G Core Network (5GC)", (Release 16), V0.3.0 (Jul. 2018), Valbonne, France, 44 pages.

\* cited by examiner (CENTRALIZED CONTROL)

(CENTRALIZED CONTROL)

(DISTRIBUTED CONTROL)

(DISTRIBUTED CONTROL)

COORDINATED CHANGE OF PROTOCOL DATA UNIT SESSION ANCHORS

CROSS-REFERENCE TO RELATED APPLICATIONS

This application is a 35 U.S.C. § 371 national stage application for International Application No. PCT/IB2019/059034, entitled "COORDINATED CHANGE OF PROTOCOL DATA UNIT SESSION ANCHORS", filed on Oct. 22, 2019, the disclosures and contents of which are hereby incorporated by reference in their entireties.

TECHNICAL FIELD

The disclosed subject matter relates generally to telecommunications, and more specifically to coordinating the change of Protocol Data Unit (PDU) Session Anchors (PSAs) for a User Equipment (UE) that has established redundant User Plane (UP) paths.

BACKGROUND

The fifth generation of mobile technology (5G) is positioned to provide a much wider range of services than are provided by the existing third generation (3G) or fourth generation (4G) technologies. 5G is expected to enable a fully connected society, in which a rich set of Use Cases—some of them are still not yet conceptualized—will be supported from the Enhanced Mobile Broadband (EMBB) through media distribution and Machine Type Communication (MTC), such as via Massive MTC (M-MTC) to Mission Critical Services, Critical MTC (C-MTC).

The C-MTC Use Case group covers a big set of applications, but most of them can be characterized by low latency and high reliability, as well as high availability. It should be mentioned that although low latency is an important criterion in numerous Use Cases, high reliability is expected to be a basic requirement in much wider range of services. For example, low latency and high reliability are very important factors in Industry (Factory) Automation Use Cases (e.g., high speed motion control, packaging, printing, etc.), and for several special subtasks of the Smart Grid service. In the above use cases, guarantees on latency and reliability requirements together provide sufficient service quality.

High reliability is also important in such use cases where there are relaxed requirements on latency (e.g., where higher delay and/or higher jitter can be tolerated). Illustrative examples include, but are not limited to, Intelligent Traffic Systems (ITS), remote control with or without haptic feedback, robotized manufacturing, Smart Grid functions, Automated Guided Vehicles (AGVs), drone controlling, telesurgery, etc. In these cases, extreme low latency is not the crucial factor, but a high reliability (and in some cases, extremely high reliability) of the connectivity between the application server and the C-MTC device is the most important requirement. In short, while reliability is a very important requirement in many use cases that have a low latency requirement, reliability in itself could be a basic characteristic of C-MTC services.

The Time-Sensitive Networking (TSN) Task Group of Institute of Electrical and Electronic Engineers (IEEE) 802.1 provides a standardized solution to satisfy low latency and high reliability requirements in fixed Ethernet networks. The Internet Engineering Task Force (IETF) DetNet activity extends the solution to layer 3 networks.

FIG. 1 illustrates the reliability solution provided by TSN/DetNet. A replication entity N1 creates a replica of each Ethernet frame/Internet Protocol (IP) packet, and assigns a sequence number to it. An elimination entity N2 uses the sequence number to find duplicates of the same frame/packet, so that only a single copy of a given frame/packet is forwarded onwards. The Frame/Packet Replication and Elimination for Reliability (FRER/PREF) function may be applied between intermediate switches, or between the end devices themselves. The paths taken by the replicated frames are configured to be disjoint, so that a fault on one path does not affect the other path.

There is a demand for a similar type of reliability approach for 5G (or even 4G/LTE) networks. One approach is shown in FIG. 2.

FIG. 2 illustrates a conventional reliability approach based on the Dual Connectivity (DC) feature of 5G or 4G/LTE. Dual connectivity allows a single User Equipment (UE) that is suitably equipped with two transceivers to have User Plane (UP) connectivity with two base stations, such as New Radio Base Stations (gNBs), shown as a Master gNB (MgNB) and a Secondary gNB (SgNB), while it is connected only to a single base station (e.g., MgNB) in the Control Plane (CP). Third Generation Partnership Project (3GPP) Technical Specifications (TS) 36.300, TS 38.300, and TS 37.340 include more details on dual connectivity in 4G/LTE and 5G.

The use of dual connectivity for redundant data transmission is described in commonly owned or assigned International Publication Number WO 2019/130048, entitled "METHODS PROVIDING DUAL CONNECTIVITY FOR REDUNDANT USER PLANE PATHS AND RELATED NETWORK NODES." In that case, the UE establishes two Protocol Data Unit (PDU) sessions, such that the Core Network (CN) selects separate User Plane Function (UPF) entities, and the CN also requests the Radio Access Network (RAN) to establish dual connectivity.

FIG. 3 illustrates another conventional reliability approach, which is to equip the terminal device with multiple physical UEs. It is then possible to set up disjoint paths with disjoint PDU-sessions from these UEs. The solution described in commonly owned or assigned International Publication Number WO 2017/137075, entitled "INDUSTRY AUTOMATION APPARATUS WITH REDUNDANT CONNECTIVITY TO A COMMUNICATION NETWORK AND CONTROLLERS THEREFOR," presents a way to select different RAN entities for the UEs based on a static grouping. The solution is illustrated in FIG. 3, where the device is equipped with separate UEs, UE1 and UE2, and the network provides redundant coverage with RAN entities gNB1 and gNB2 that are preferably selected such that UE1 connects to gNB1, and UE2 connects to gNB2.

Problems with Existing Solutions

In the case of redundant paths, mobility handling requires special attention. In commonly owned or assigned International Publication Number WO 2019/011434, entitled "METHODS AND APPARATUS FOR HANDOVER CONTROL OF AFFILIATED COMMUNICATION MODULES IN A WIRELESS COMMUNICATION NETWORK," a solution is given for avoiding simultaneous handovers in the case of multiple UEs per device. The handover is a volatile process, when interruption or failure may take place. Hence, it is useful to co-ordinate the RAN handovers for the gNBs in the two paths, so that at least one path is always available. The solution in WO 2019/011434 introduces a locking mechanism such that in the case of handover, the other path defers handovers if possible. However, since a handover usually does not involve a change of a PDU Session Anchor (PSA), WO 2019/011434 does not address this issue.

Besides the RAN handovers, mobility may also take place in the core network when the PDU Session Anchor (PSA) is relocated. Such an anchor change can take place when the UE has moved away from its original location and it is determined in the core network that a change of the PSA is beneficial, e.g., for reducing the end-to-end latency. There are several ways to execute an anchor change: 3GPP TS 23.502 section 4.3.5 defined procedures for Session and Service Continuity (SSC) mode 2 when the old PDU session is released before a new PDU session is established and for SSC mode 3 when the new PDU session is established before the old PDU session is released. Additionally, the solution in commonly owned or assigned International Patent Application Serial Number PCT/IB2019/050444, filed on Jan. 18, 2019, proposes a way for Ethernet PDU Sessions to change the anchor (PSA) of an existing session without the need to establish a new session. However, that solution does not address the particular problems that arise where there are redundant user plane paths.

In the case of mobility with change of the anchor point with redundant user plane paths, disruptions may occur due to the anchor point change. The disruption may be a result of the anchor point change itself, or may be due to the fact that a change of the anchor point can lead to the need to configure a new end-to-end path. Due to the risk of disruptions following an anchor point change it is beneficial to make sure that anchor point changes on the different paths are coordinated in time, in order to avoid simultaneous anchor point changes on multiple paths. Due to redundancy, if the anchor changes are not simultaneous, disruptions can be avoided. However, if the anchor changes happen at the same time on both paths, the disruption can be significant. Currently there is no way to avoid such simultaneous anchor changes.

SUMMARY

The present disclosure provides for coordination of the PSA change in the case of redundant PDU Sessions. The solution provides coordination in order to avoid a situation where the PSA of the redundant PDU Sessions are changed simultaneously. This is avoided by a locking database which prevents PSA change for the other PDU Session once a PSA change is in progress. The locking database may be implemented as a central function, or distributed in the core network, or realized in RAN. The solution with locking realized in RAN can provide not only coordination between PSA changes of the two sessions, but also between PSA change and handover in RAN; thereby achieving full coordination for redundant sessions to avoid any disruption at mobility.

According to some embodiments, a method for coordinated change of PSAs comprises, at a node for maintaining PSA change status for PDU sessions, receiving a request for a PSA change or handover for a first PDU session having a first PSA, where the first PDU session and a second PDU session having a second PSA different from the first PSA are redundant PDU sessions with each other. If the second PDU session is undergoing a PSA change or handover, the request to change the first PDU session is denied; otherwise, the request to change the first PDU session is granted, and the second PDU session will not be allowed to be changed until the change to the first PDU session is complete.

According to one aspect of the present disclosure, a method for coordinated change of Protocol Data Unit (PDU) Session Anchors (PSAs) comprises: at a node for maintaining PSA change status for PDU sessions: receiving a request for a PSA change for a first PDU session having a first PSA, where the first PDU session and a second PDU session are redundant PDU sessions with each other; determining whether the PSA change for the first PDU session is temporarily prohibited; upon determining that the PSA change for the first PDU session is temporarily prohibited, denying the request for the PSA change for the first PDU session; and upon determining that the PSA change for the first PDU session is not temporarily prohibited: granting the request for the PSA change for the first PDU session; setting a PSA change status associated with the first PDU session to indicate that the PSA change for the first PDU session is temporarily prohibited; subsequently receiving an indication that the PSA change for the first PDU session is completed; and setting the PSA change status associated with the first PDU session to indicate that the PSA change for the first PDU session is allowed, wherein determining that the PSA change for the first PDU session is temporarily prohibited comprises at least one of: determining that the first PDU session is currently undergoing a handover; determining that the second PDU session is currently undergoing a handover; and determining that the second PDU session is currently undergoing a PSA change.

In some embodiments, the PSA change status associated with the first PDU session is also associated with the second PDU session.

In some embodiments, setting the PSA change status associated with the first PDU session to indicate that the PSA change for the first PDU session is temporarily prohibited further comprises setting a PSA change status associated with the second PDU session to indicate that a PSA change for the second PDU session is temporarily prohibited, and setting the PSA change status associated with the first PDU session to indicate that the PSA change for the first PDU session is allowed further comprises setting the PSA change status associated with the second PDU session to indicate that the PSA change for the second PDU session is allowed.

In some embodiments, the node for maintaining PSA change status for PDU sessions comprises a synchronization database function for maintaining PSA change status variables that indicate PSA change status for PDU sessions.

According to another aspect of the present disclosure, a method for coordinated change of PSAs comprises: at a first node being associated with a first PDU session: receiving, from a requesting entity, a request for a PSA change for the first PDU session, where the first PDU session and a second PDU session are redundant PDU sessions with each other; determining whether the PSA change for the first PDU session is temporarily prohibited; upon a determination that the PSA change for the first PDU session is temporarily prohibited: denying the request for the PSA change for the first PDU session; and subsequently determining that the PSA change for the first PDU session is allowed; and upon a determination that the PSA change for the first PDU session is not temporarily prohibited: granting the request for the PSA change for the first PDU session; setting a PSA change status associated with the first PDU session to indicate that the PSA change is temporarily prohibited; subsequently receiving an indication that the PSA change for the first PDU session is completed; and setting the PSA change status associated with the first PDU session to indicate that the PSA change is allowed, wherein determining that the PSA change for the first PDU session is temporarily prohibited comprises at least one of: determining that the first PDU session is currently undergoing a handover; determining that the second PDU session is currently undergoing a handover; and determining that the second PDU session is currently undergoing a PSA change.

In some embodiments, the method further comprises, subsequent to denying the request for the PSA change for the first PDU session: determining that the PSA change for the first PDU session is allowed; and setting the PSA change status associated with the first PDU session to indicate that the PSA change is allowed.

In some embodiments, the method further comprises notifying the requesting entity that the PSA change for the first PDU session is now allowed.

In some embodiments, the requesting entity comprises a Session Management Function (SMF) that is associated with the PSA that is being changed.

In some embodiments, the first node being associated with the first PDU session comprises a Radio Access Network (RAN) node.

In some embodiments, the RAN node comprises a New Radio Base Station (gNB).

In some embodiments, the second node being associated with the second PDU session comprises a RAN node.

In some embodiments, the RAN node comprises a gNB.

According to another aspect of the present disclosure, a method for coordinated change of PSAs comprises: at a SMF node: determining that a PSA change is needed for a first PDU session having a first PSA, where the first PDU session and a second PDU session are redundant PDU sessions with each other; sending, to a node for maintaining PSA change status for PDU sessions, a request for the PSA change for the first PDU session; receiving, from the node for maintaining PSA change status for PDU sessions, a response to the request for the PSA change for the first PDU session, and if the response to the request for the PSA change for the first PDU session indicates that the PSA change is allowed, initiating the PSA change for the first PDU session; and if the response to the request for the PSA change for the first PDU session indicates that the PSA change is temporarily prohibited, not initiating the PSA change for the first PDU session.

In some embodiments, if the response to the request for the PSA change for the first PDU session indicates that the PSA change is temporarily prohibited, the process further comprises: receiving a notification that the temporarily prohibited PSA change is now allowed; and resending the request for the PSA change for the first PDU session to the node for maintaining PSA change status for PDU sessions.

In some embodiments, sending the request for the PSA change for the first PDU session to the node for maintaining PSA change status for PDU sessions comprises sending the request to a core network node.

In some embodiments, sending the request for the PSA change for the first PDU session to the node for maintaining PSA change status for PDU sessions comprises sending the request to a RAN node.

In some embodiments, sending the request to the RAN node comprises sending the request to a gNB.

According to another aspect of the present disclosure, a method for coordinated change of PSAs comprises: at a SMF node: performing a PSA change for a PDU session having a first PSA; and sending, to a node for maintaining PSA change status for PDU sessions, an indication that the PSA change for the first PDU session has completed.

In some embodiments, performing the PSA change for the first PDU session having the first PSA comprises creating a new PDU session having a second PSA that is different from the first PSA.

In some embodiments, the node for maintaining PSA change status for PDU sessions comprises a core network node.

In some embodiments, the node for maintaining PSA change status for PDU sessions comprises a RAN node.

In some embodiments, the RAN node comprises a gNB.

According to another aspect of the present disclosure, a method for coordinated change of PSAs comprises: at a node for maintaining PSA change and handover status for PDU sessions: receiving a request for a handover for a first PDU session having a first PSA, where the first PDU session and a second PDU session are redundant PDU sessions with each other; determining whether the handover for the first PDU session is temporarily prohibited; upon determining that the handover for the first PDU session is temporarily prohibited, denying the request for the handover for the first PDU session; and upon determining that the handover for the first PDU session is not temporarily prohibited: allowing the handover for the first PDU session; setting a change status associated with the first PDU session to indicate that a PSA change or handover for the first PDU session is temporarily prohibited; subsequently receiving an indication that the handover for the first PDU session is completed; and setting the change status associated with the first PDU session to indicate that a PSA change or handover for the first PDU session is allowed, wherein determining that the handover for the first PDU session is temporarily prohibited comprises at least one of: determining that the first PDU session is currently undergoing a PSA change; determining that the second PDU session is currently undergoing a handover; and determining that the second PDU session is currently undergoing a PSA change.

In some embodiments, the change status associated with the first PDU session is also associated with the second PDU session.

In some embodiments, setting a change status associated with the first PDU session to indicate that a PSA change or handover for the first PDU session is temporarily prohibited further comprises setting a change status associated with the second PDU session to indicate that a PSA change or handover for the second PDU session is temporarily prohibited, and setting a change status associated with the first PDU session to indicate that a PSA change or handover for the first PDU session is allowed further comprises setting a change status associated with the second PDU session to indicate that a PSA change or handover for the second PDU session is allowed.

In some embodiments, the node for maintaining PSA change or handover status for PDU sessions comprises a synchronization database function for maintaining change status variables that indicate PSA change or handover status for PDU sessions.

According to another aspect of the present disclosure, a method for coordinated change of PSAs comprises: at a first node being associated with a first PDU session: determining that a handover is needed for the first PDU session having a first PSA, where the first PDU session and a second PDU session are redundant PDU sessions with each other; determining whether the handover for the first PDU session is temporarily prohibited; upon a determination that the handover for the first PDU session is temporarily prohibited, postponing the handover for the first PDU session; and upon a determination that the handover for the first PDU session is not temporarily prohibited: setting the change status associated with the first PDU session to indicate that a PSA change or handover for the first PDU session is temporarily prohibited; performing the handover for the second PDU session; and setting the change status associated with the first PDU session to indicate that a PSA change or handover is allowed, wherein determining that a PSA change or handover for the first PDU session is temporarily prohibited comprises at least one of: determining that the first PDU session is currently undergoing a PSA change; determining that the second PDU session is currently undergoing a PSA change; and determining that the second PDU session is currently undergoing a handover.

In some embodiments, the first node being associated with the first PDU session comprises a RAN node.

In some embodiments, the RAN node comprises a gNB.

In some embodiments, a second node being associated with the second PDU session comprises a RAN node.

In some embodiments, the RAN node comprises a gNB.

According to another aspect of the present disclosure, a network node for coordinated change of PSAs comprises processing circuitry that performs any of the methods disclosed herein.

In some embodiments, the network node comprises a core network node.

In some embodiments, the network node comprises a SMF.

In some embodiments, the network node comprises a RAN node.

In some embodiments, the network node comprises a gNB.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
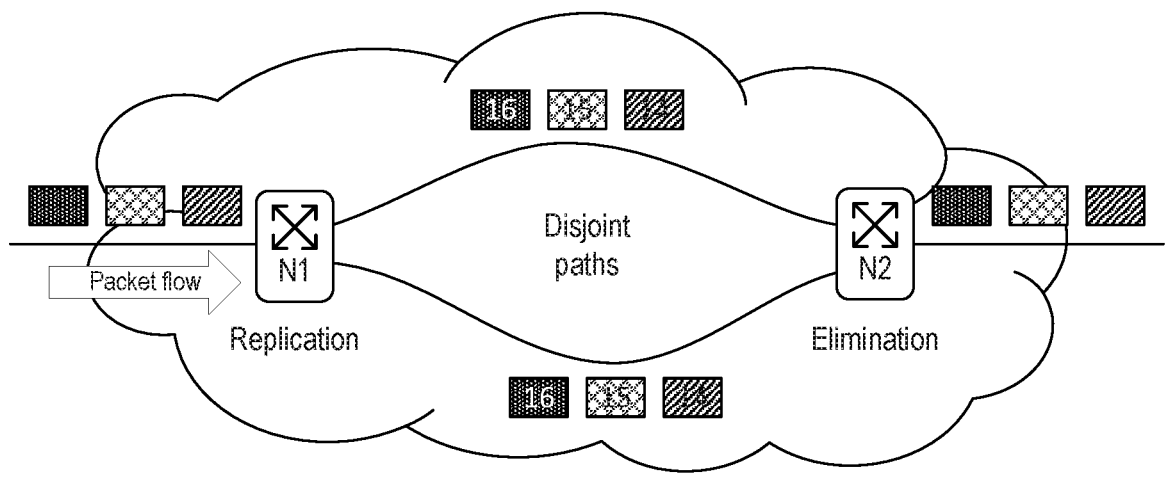
FIG. 1 illustrates a conventional reliability solution.
Figure 2:
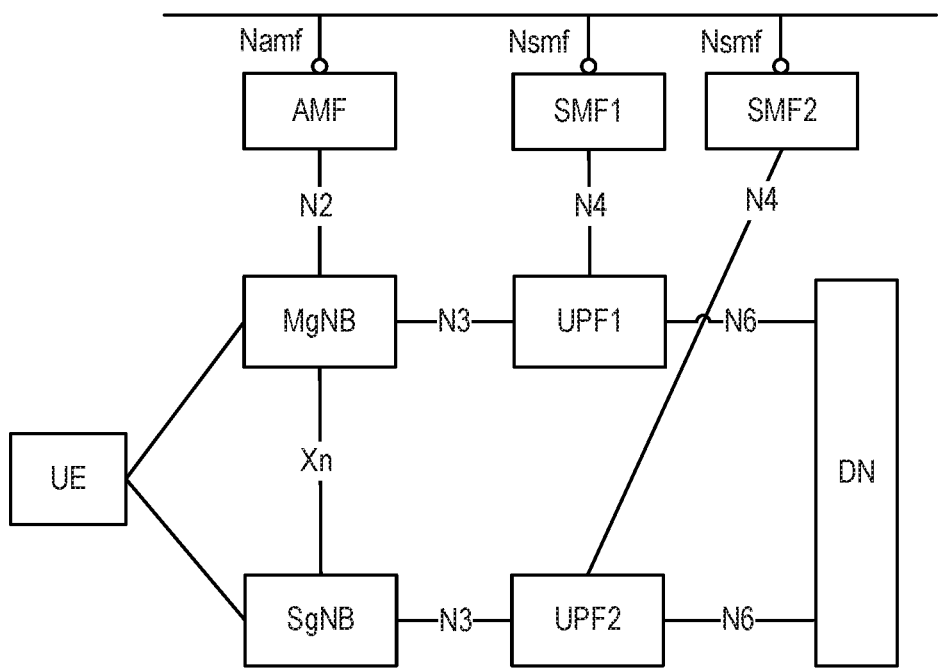
FIG. 2 illustrates another conventional reliability approach based on the Dual Connectivity (DC) feature of 5G or 4G/LTE.
Figure 3:
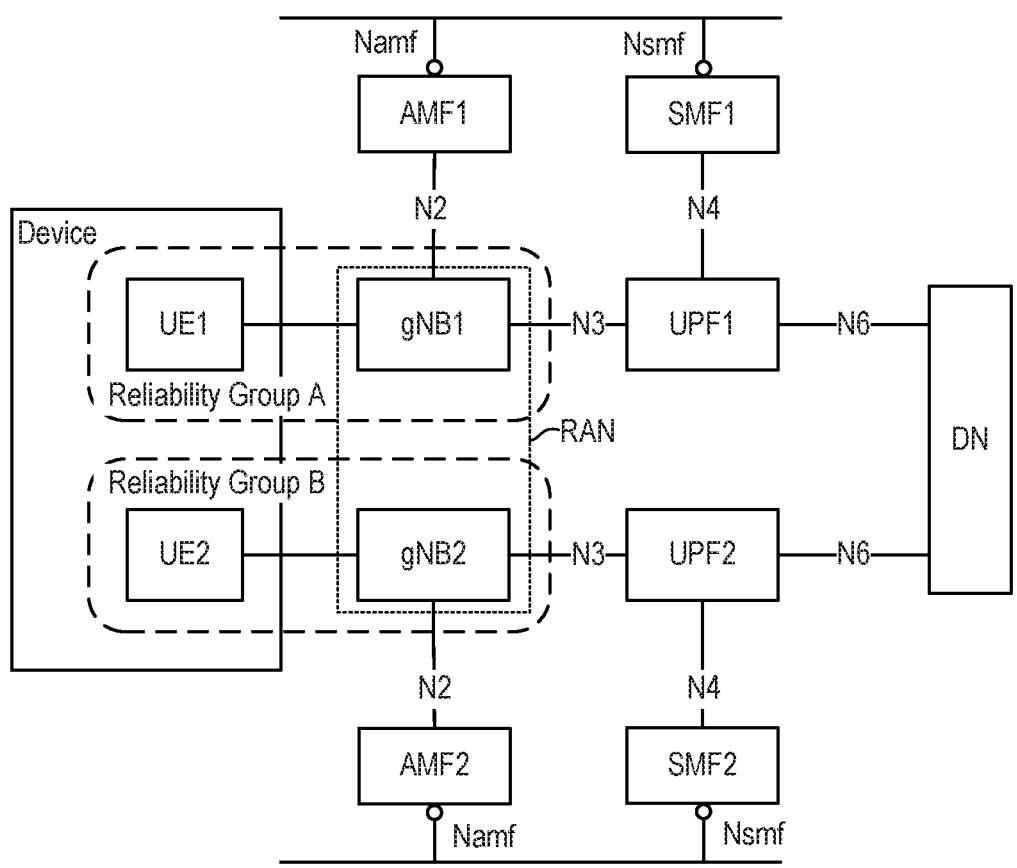
FIG. 3 illustrates another conventional reliability approach in which a terminal device is equipped with multiple physical UEs.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
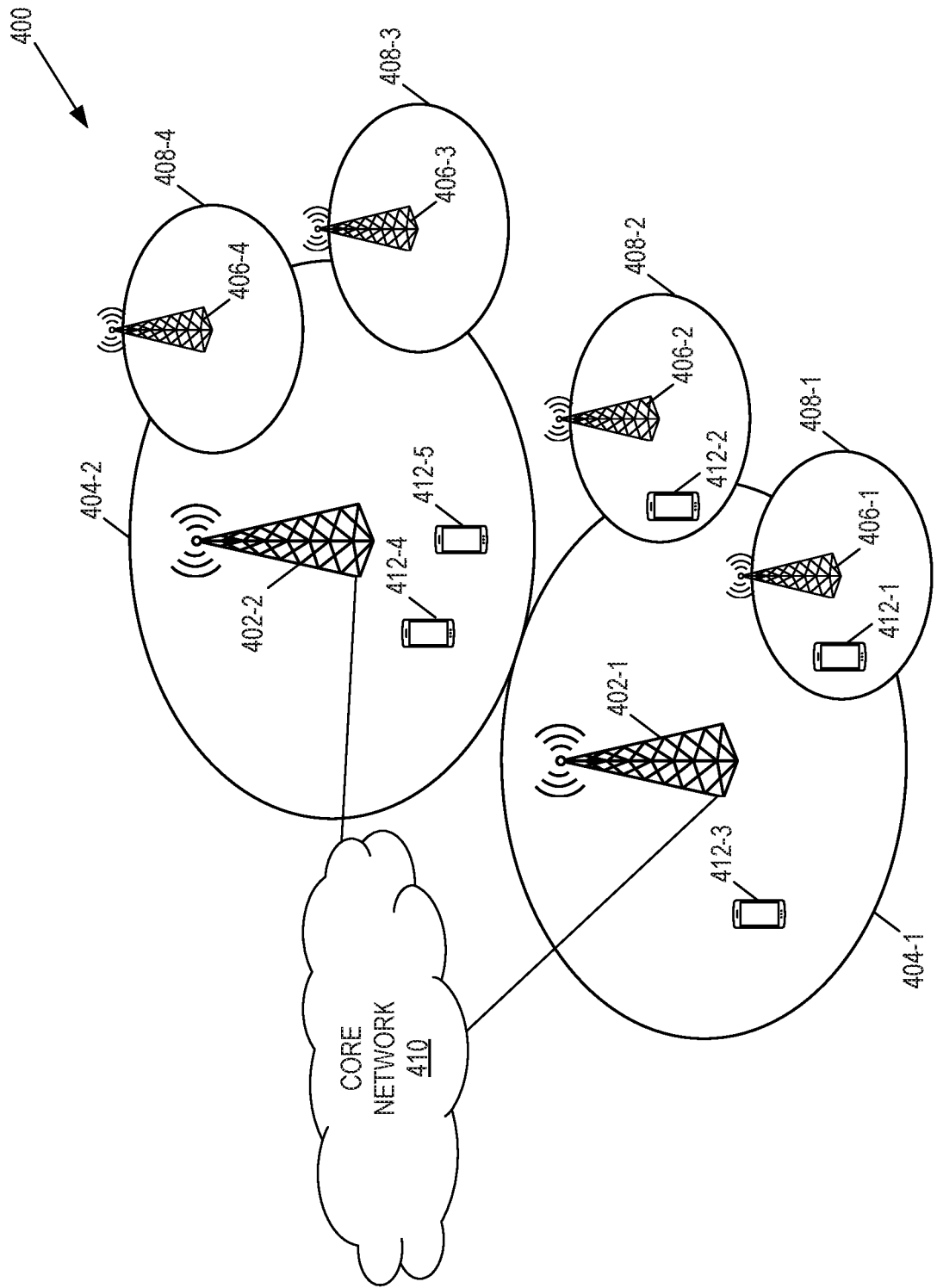
FIG. 4 illustrates an exemplary cellular communications network according to some embodiments of the present disclosure.

FIG. 4 illustrates one example of a cellular communications system 400 in which embodiments of the present disclosure may be implemented. In the embodiments described herein, the cellular communications system 400 is a 5G system (5GS) including a NR RAN or LTE RAN (i.e., E-UTRA RAN). In this example, the RAN includes base stations 402-1 and 402-2, which in 5G NR are referred to as gNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G core (5GC). The base stations 402 (and optionally the low power nodes 406) are connected to the core network 410.

The base stations 402 and the low power nodes 406 provide service to wireless devices 412-1 through 412-5 in the corresponding cells 404 and 408. The wireless devices 412-1 through 412-5 are generally referred to herein collectively as wireless devices 412 and individually as wireless device 412. The wireless devices 412 are also sometimes referred to herein as UEs.

Figure 5:
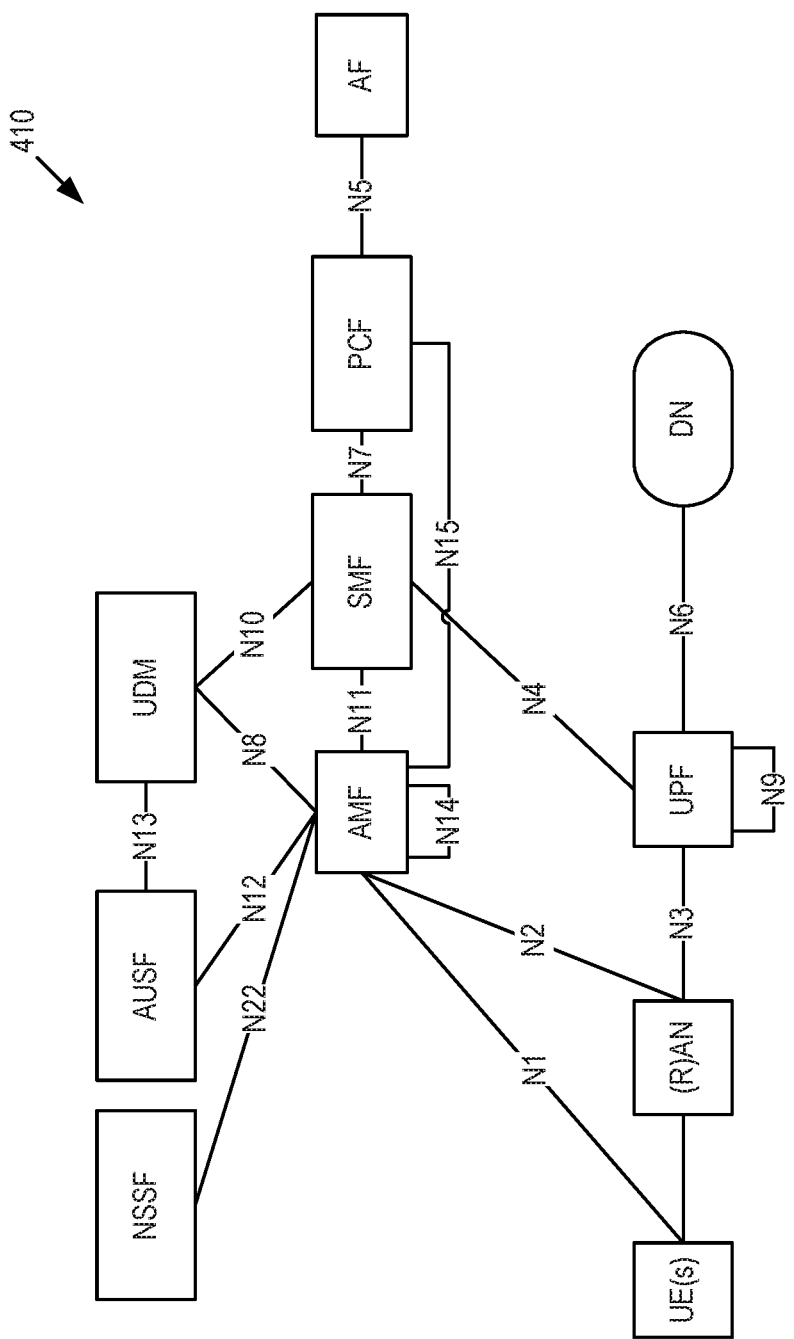
FIG. 5 illustrates an exemplary wireless communication system represented as a 5G network architecture composed of core Network Functions (NFs), where interaction between any two NFs is represented by a point-to-point reference point/interface.

FIG. 5 illustrates a wireless communication system represented as a 5G network architecture composed of core Network Functions (NFs), where interaction between any two NFs is represented by a point-to-point reference point/interface. FIG. 5 can be viewed as one particular implementation of the system 400 of FIG. 4.

Seen from the access side the 5G network architecture shown in FIG. 5 comprises a plurality of User Equipment (UEs) connected to either a Radio Access Network (RAN) or an Access Network (AN) as well as an Access and Mobility Management Function (AMF). Typically, the (R)AN comprises base stations, e.g., such as evolved Node Bs (eNBs) or NR base stations (gNBs) or similar. Seen from the core network side, the 5G core NFs shown in FIG. 5 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 5, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 5. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 6:
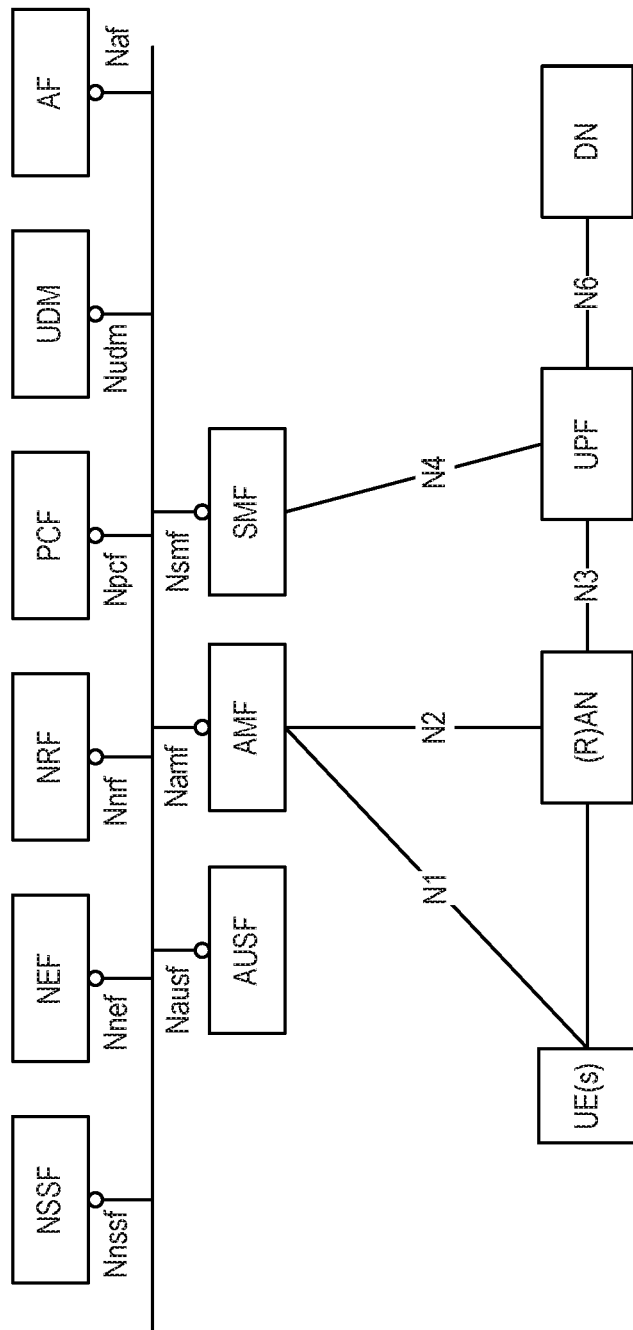
FIG. 6 illustrates a 5G network architecture using service-based interfaces between the NFs in the control plane, instead of the point-to-point reference points/interfaces used in the 5G network architecture of FIG. 5.

FIG. 6 illustrates a 5G network architecture using service-based interfaces between the NFs in the control plane, instead of the point-to-point reference points/interfaces used in the 5G network architecture of FIG. 5. However, the NFs described above with reference to FIG. 5 correspond to the NFs shown in FIG. 6. The service(s) etc. that a NF provides to other authorized NFs can be exposed to the authorized NFs through the service-based interface. In FIG. 6 the service based interfaces are indicated by the letter "N" followed by the name of the NF, e.g., Namf for the service based interface of the AMF and Nsmf for the service based interface of the SMF etc. The Network Exposure Function (NEF) and the Network Function (NF) Repository Function (NRF) in FIG. 6 are not shown in FIG. 5 discussed above. However, it should be clarified that all NFs depicted in FIG. 5 can interact with the NEF and the NRF of FIG. 6 as necessary, though not explicitly indicated in FIG. 5.

Some properties of the NFs shown in FIGS. 5 and 6 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 7:
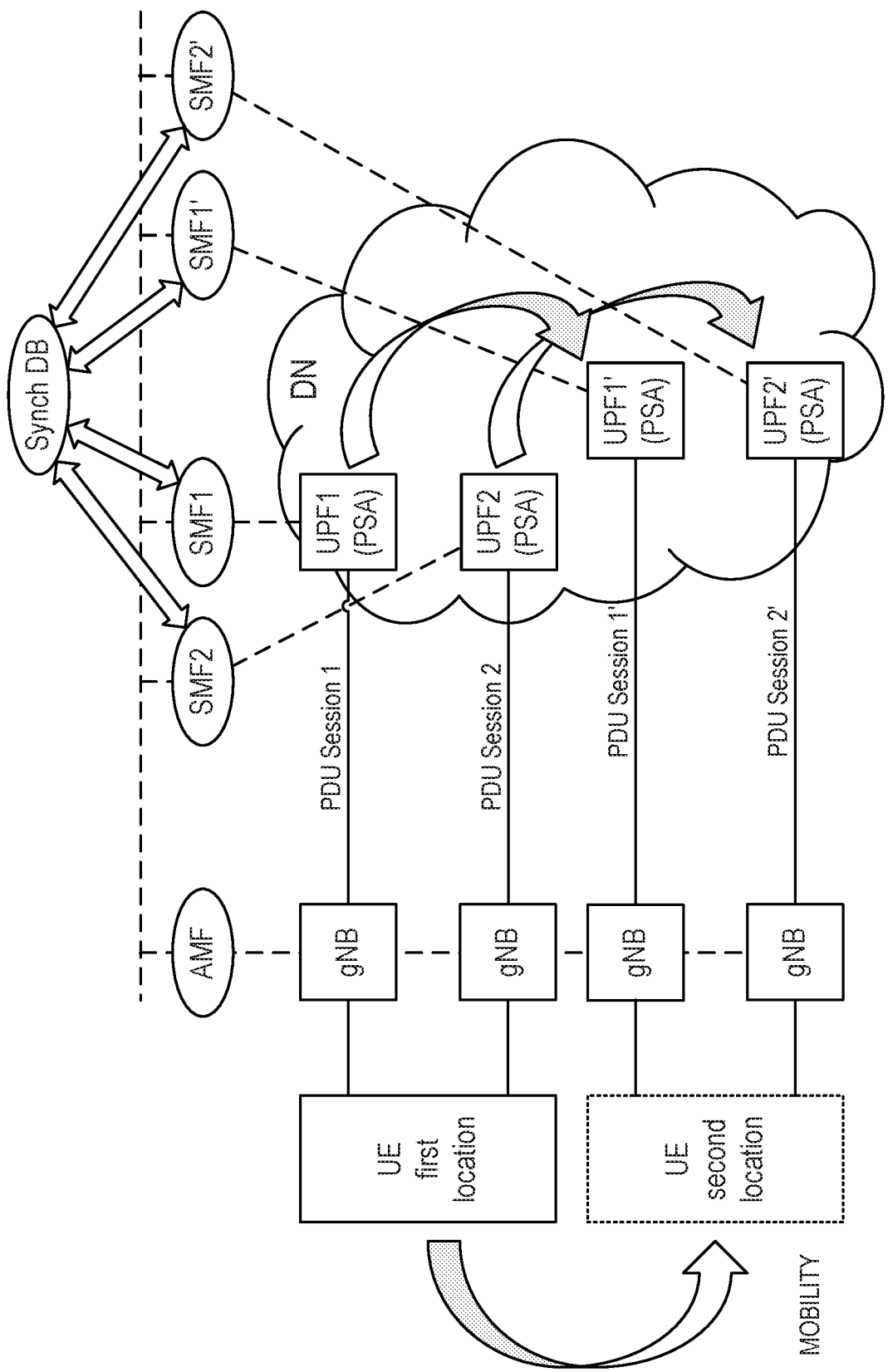
FIG. 7 illustrates an exemplary system for providing coordinated change of PDU session anchors according to some embodiments of the present disclosure.

FIG. 7 illustrates an exemplary system for providing coordinated change of PDU session anchors according to some embodiments of the present disclosure. FIG. 7 illustrates coordination for a PSA change in case where there are redundant PDU Sessions and a User Equipment (UE) or other terminal device (which, for brevity, may be referred to as "the UE" or "the device") moves from a first mobility configuration to a second mobility configuration, e.g., when a UE moves from a first location to a second location.

In the embodiment illustrated in FIG. 7, before the move the UE has two redundant PDU Sessions to the DN (Data Network) with User Plane Functions UPF1 and UPF2 acting as the PSAs, controlled by Session Management Functions SMF1 and SMF2, respectively. In the embodiment illustrated in FIG. 7, PDU session 1 connects the UE to the DN via UPF1, and PDU session 2 connects the UE to the DN via UPF2. After the UE moves from the first location to the second location, the anchors are changed to User Plane Functions UPF1' and UPF2', controlled by Session Management Functions SMF1' and SMF2', respectively. In the embodiment illustrated in FIG. 7, PDU session 1' connects the UE to the DN via UPF1' and PDU Session 2' connects the UE to the DN via UPF2'.

The systems and methods of the present disclosure provide coordination in order to avoid changing UPF1 to UPF1' (and the associated configuration changes) at the same time as changing UPF2 to UPF2' (and the associated configuration changes). In some embodiments of the present disclosure, this is achieved by a locking database that facilitates the coordination of the PSA change processes with the respective SMF entities. In the embodiment illustrated in FIG. 7, the locking database is implemented in the logical "Synch DB" function. In some embodiments, the PDU Sessions can be correlated in the Synch DB function by a set of identifiers, such as the combination of SUPI, DNN and S-NSSAI, which are provided to the Synch DB function.

In some embodiments, there will be some a priori information which determines which PDU sessions are related. For example, the combination of DNN and S-NSSAI parameters could be used to determine the pairing. In some embodiments, other or additional information, such as subscription, local configuration, or other information, may be used to determine which PDU sessions are related. In some embodiments, the Synch DB uses some or all of these parameters or other parameters to determine which PDU sessions are paired.

In some embodiments, before starting a PSA change on a first path, a control plane entity indicates the intention to perform the PSA change and checks whether a PSA change is in progress for one of the other paths. If a PSA change is in progress for one of the other paths, the PSA change for the first path is postponed. The PSA change is executed only when the ongoing PSA change on another path and related other actions (such as reconfiguration of the end-to-end user plane paths) are completed.

It is noted that, depending on the realization of the anchor change, the SMFs may or may not change during anchor change. In FIG. 7, for example, it is possible that SMF1 and SMF1' coincide, and it is possible that SMF2 and SMF2' coincide. Moreover, the two SMFs handling the UPFs may or may not be the same, e.g., it is possible that SMF1 and SMF2 coincide, and similarly it is possible that SMF1' and SMF2' coincide.

In some embodiments, the Synch DB is a logical function, which may be a separate, centralized function, or it may be a distributed database. In some embodiments, the Synch DB may be co-located with other entities. For example, in some embodiments, the Synch DB may be integrated into the SMF entities or into the AMF entities.

In some embodiments, the two redundant PDU Sessions from the device may be realized either using two UEs integrated within the device, or using a single UE and relying on RAN dual connectivity feature.

Basic Solution

Figure 8A:
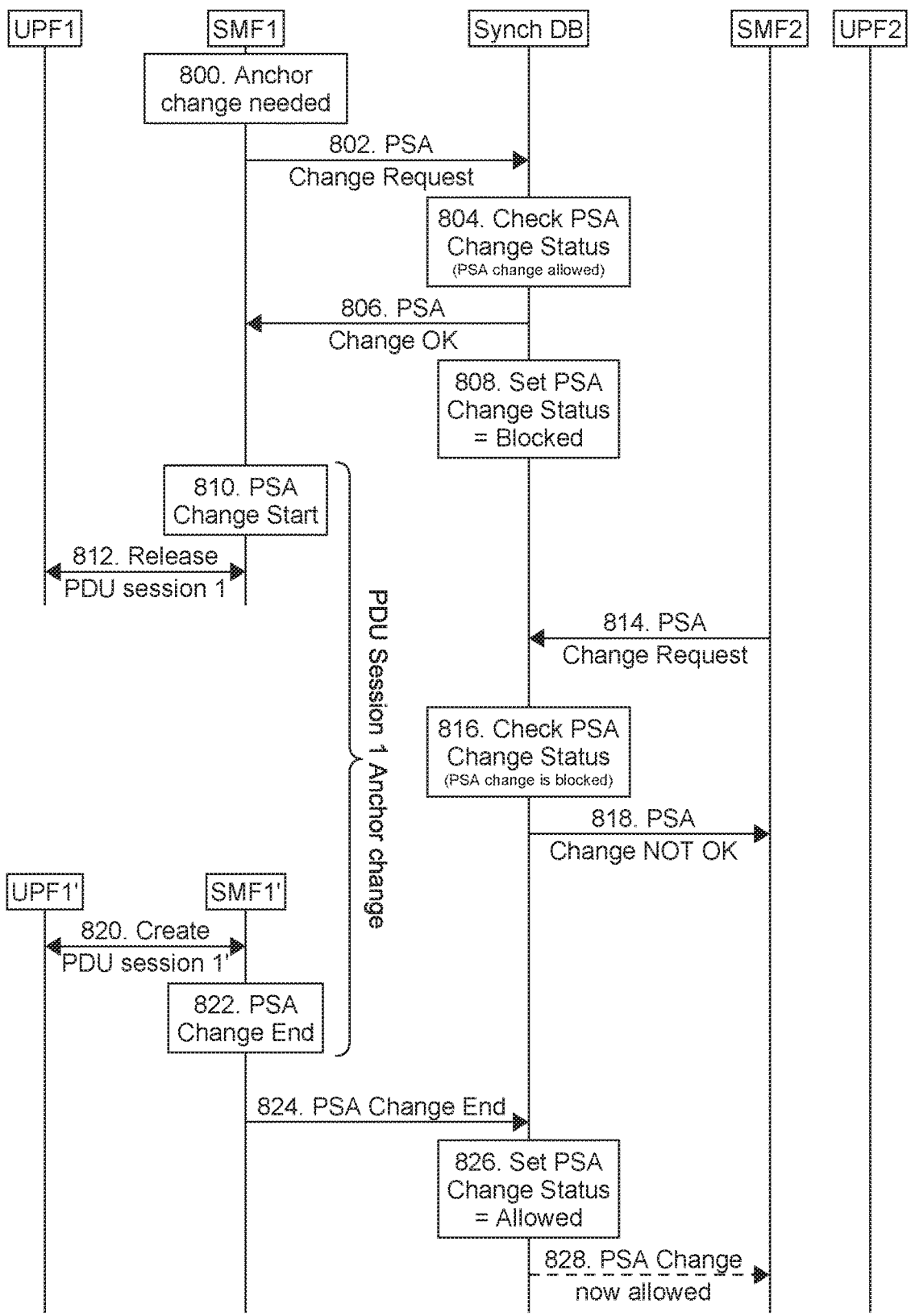
FIGS. 8A and 8B are signaling graphs showing messages exchanged during an exemplary process for coordinated change of PDU session anchors according to some embodiments of the present disclosure.
Figure 8B:
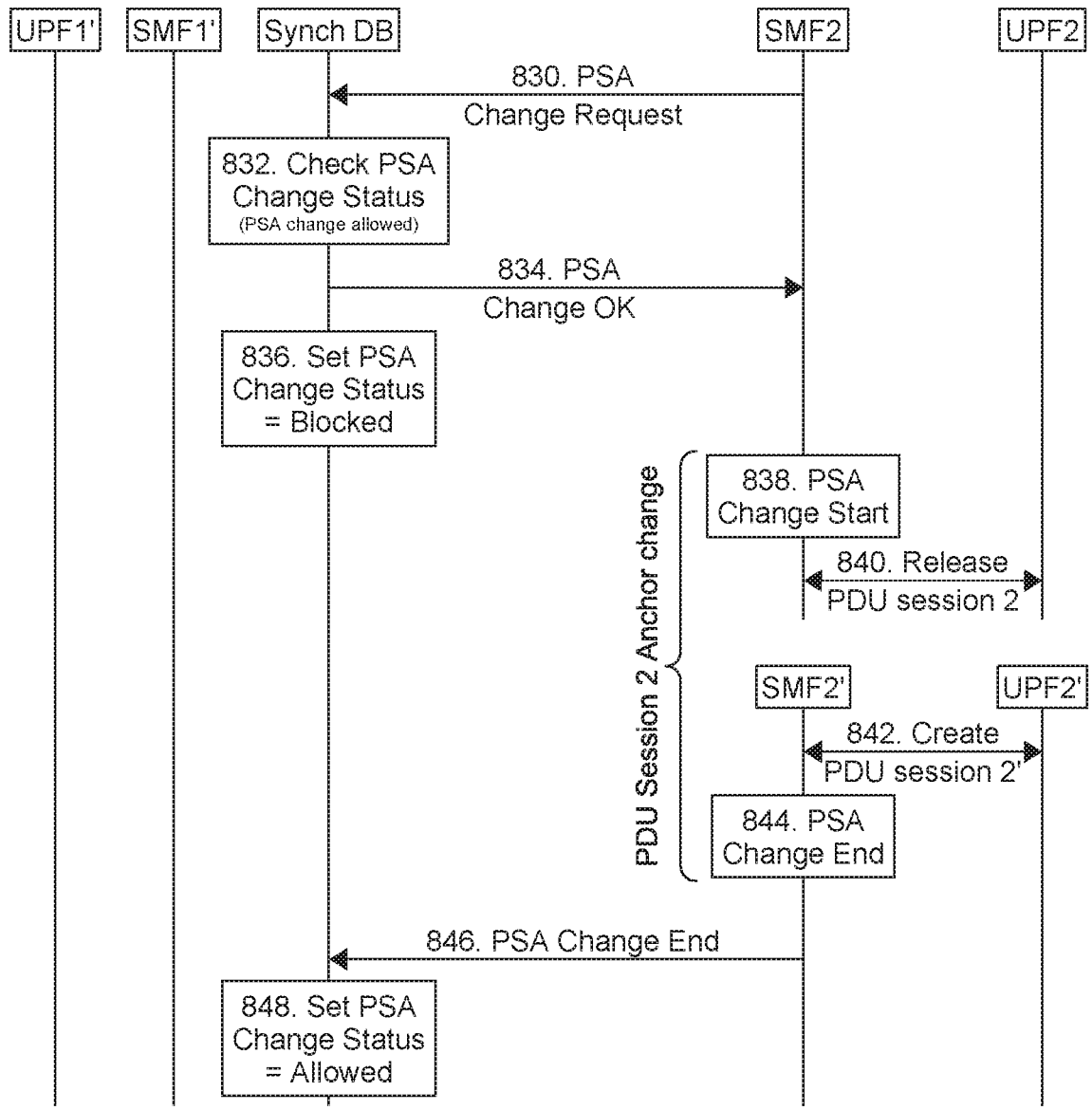

FIGS. 8A and 8B are signaling graphs showing messages exchanged during an exemplary process for coordinated change of PDU session anchors according to some embodiments of the present disclosure. FIGS. 8A and 8B are signaling charts involving SMF entities that are responsible for executing the anchor change processes and a common Synch DB (database) that is implementing a locking function to avoid simultaneous anchor change. The process begins on FIG. 8A and continues on FIG. 8B.

In the embodiment illustrated in FIG. 8A, the process includes the steps detailed below.

Step 800. A first SMF (SMF1) determines the need for an anchor change of PDU session 1, which in this example is associated with a wireless device. As used hereinafter, the terms "UE," "device," and "wireless device" may be used interchangeably.

Step 802. Before starting the process of the anchor change, SMF1 sends a PSA anchor change request to a node for maintaining PSA change status, which in the embodiment illustrated in FIGS. 8A and 8B is labeled "Synch DB."

Step 804. The Synch DB checks the PSA change status and determines that a PSA change is not locked, i.e., that a PSA change is not currently in progress. In some embodiments, checking the PSA change status comprises determining whether the PDU session that is the subject of the PSA change request and another PDU session are redundant PDU sessions with each other (which may also be referred to as being disjoint paths), and determining whether that second PDU session is currently undergoing a PSA change. Likewise, checking the PSA change status may comprise determining whether the PDU session that is the subject of the change request is currently undergoing a PSA change. If a PDU session is currently undergoing a PSA change, that may be noted in some manner, e.g., by setting a flag or entry in a database, or other technique. When a PDU session is currently undergoing a PSA change, the redundant PDU sessions will be temporarily blocked or prevented from also undergoing a PSA change; this may be referred to herein as being "blocked," "locked," or being subject to a "PSA change lock."

Step 806. The Synch DB allows the anchor change by responding with a PSA change OK message. In the embodiment illustrated in FIG. 8A, a PSA change is possible at this point in the process because there is no other PSA change in progress for the other session of the device involving the disjoint path.

Step 808. The Synch DB sets the PSA change status to "blocked," to temporarily prohibit additional PSA changes to any of the redundant PDU sessions.

In some embodiments, the Synch DB may associate the blocked status with just the PDU session being changed (e.g., PDU session 1), and if a PSA change request for PDU session 2 is received, the Synch DB first determines that PDU session 1 is redundant with PDU session 2, then checks the PSA status PDU session 1 to determine if the PSA for PDU session 2 may be changed. When the PSA change for PDU session 1 is complete, the Synch DB will change the PSA change status for just PDU session 1.

In alternative embodiments, the Synch DB may associate the blocked status not with the PDU session being changed but to all of the PDU sessions that are redundant sessions with the PDU session being changed. For example, while PDU session 1 is undergoing a PSA change, the Synch DB may put a lock on PDU session 2. In this embodiment, if a PSA change request for PDU session 2 is received, the Synch DB may check the PSA change status of PDU session 2 directly. When the PSA change for PDU session 1 is complete, the Synch DB will adjust the PSA change status for all of the other redundant PDU sessions, such as PDU session 2 in this example.

In other alternative embodiments, the Synch DB may associate the blocked status not only with the PDU session undergoing a PSA change but may also set the PSA change status of all of the redundant sessions as blocked. When the PSA change for one of the PDU sessions is complete, the Synch DB will adjust the PSA change status for all of the redundant PDU sessions, including the PDU session that just completed the PSA change.

In still other alternative embodiments, the Synch DB associates a blocked status with a variable that represents the collection of redundant PDU sessions, rather than any particular PDU session. In these embodiments, specific PDU sessions, such as PDU session 1 and PDU session 2 in FIG. 8A and FIG. 8B, are associated with that variable. In these embodiments, the Synch DB need only maintain information indicating whether or not there is an ongoing PSA change without being specific about which of the redundant PDU sessions in particular is undergoing that PSA change.

Finally, it is noted that where the redundant PDU sessions are associated with one particular UE, the PSA change lock may be thought of as applying to that particular UE in general. In such a scenario it may also be said that the particular UE (rather than a specific PDU session) is subject to the PSA change lock.

It is noted that steps 806 and 808 can be in any order.

Step 810. SMF1 starts the PSA change process.

Step 812. The session via UPF1, called PDU session 1, is released.

Step 814. A request arrives to the Synch DB to perform another PSA change.

Step 816. The Synch DB checks the PSA change status and determines that a PSA change lock is in place.

Step 818. That request is rejected due to the ongoing PSA change.

However, in some embodiments, the Synch DB may remember the request, so that it can notify the requestor once the PSA change becomes possible.

As part of the PSA change process, the SMF entity may in certain cases change. In the example shown in FIG. 8A, the SMF entity changes from SMF1 to SMF1'. However, as will be discussed in more detail below, such change does not necessarily occur in all cases.

Step 820. SMF1' establishes the user plane of the PDU Session via a new UPF, UPF1', which has been changed compared to UPF1. This PDU session is referred to as PDU Session 1'.

Step 822. The PSA change process ends for the first PDU session. (Note that the figure here does not show all the messaging that may take place with a PSA anchor change).

Step 824. The end of the PSA change is indicated to the Synch DB. (This may also indicate the change of the SMF when necessary.)

Step 826. The Synch DB releases the lock on the PSA change for the given device, e.g., by setting the PSA change status to "allowed."

Step 828. The Synch DB may optionally send a notification to SMF2 that the lock has been released. (If the system does not provide such a notification, then SMF2 would need to repeatedly try to request a PSA change until it becomes available).

The process continues in FIG. 8B. In the embodiment illustrated in FIG. 8B, the process includes the steps detailed below.

Step 830. SMF2 again requests a PSA change. This request can now succeed given that there is no longer a parallel PSA change in progress.

Step 832. The Synch DB checks the PSA change status and determines that a PSA change for PDU session 2 is allowed.

Step 834. The Synch DB allows the anchor change by responding with a PSA change OK message. The PSA change process can now start for the second PDU session ("PDU session 2").

Step 836. A lock is placed for PSA change for the given device in the Synch DB.

It is noted that steps 834 and 836 can be performed in any order.

Step 838. SMF2 begins the PSA change process.

Step 840. As part of the PSA change, the user plane via UPF2 is released. In the embodiment illustrated in FIG. 8B, the SMF2 function changes to SMF2' during the PSA change process, even though such a change is not always necessary.

Step 842. SMF2' creates the user plane session via UPF2', which is the new PSA that has been changed from UPF2. This PDU session is called PDU session 2'.

Step 844. The PSA change process for the second PDU session ends.

Step 846. The end of the PSA change is signaled to the Synch DB.

Step 848. The Synch DB then releases the lock, e.g., by setting the PSA change status to "allowed."

PSA Change Types

Different types of PSA changes can be possible. The present disclosure describes four alternatives.

Alternative 1. One possibility is described in International Patent Application Serial Number PCT/IB2019/050444, filed on Jan. 18, 2019, for Ethernet PDU Sessions, where the PSA of an existing PDU Session is changed. In that case, the SMF remains unchanged, and the PSA can be changed without releasing or re-establishing the session.

Alternative 2. A second possibility is the SSC mode 2 PSA change as described in 3GPP TS 23.502 section 4.3.5.1. In that case, the PDU Session is first released with a cause code to the UE that indicates the requirement to re-establish a new PDU session.

Alternative 3. A third possibility is the SSC mode 3 PSA change as described in 3GPP TS 23.502 section 4.3.5.2. In that case, a new PDU Session is established first based on a network indication that a new PDU Session to the same data network is needed. Once the new PDU session is established and the data flows are transferred to the new PDU session, the old PDU session is released.

Alternative 4. A fourth possibility is the SSC mode 3 PSA change with an IPv6 multi-homed session as described in 3GPP TS 23.502 section 4.3.5.3. In that case, a new PDU Session anchor is established first, together with a user plane branching point. The new IPv6 address is provided to the terminal. Once the data flows use the new address via the new anchor point, the old anchor can be released (together with the branching point).

In the case of alternative 1 and alternative 4, the SMF remains unchanged in the process. Hence, it does not pose any problem for the SMF to notify the central database about the end of the PSA change process. However, in the case of alternative 2 and alternative 3, the SMF changes as part of the anchor change, and the new SMF may not know whether the established PDU Session was due to a PSA change. Therefore, additional mechanisms are needed to trigger the new SMF to indicate to the Synch DB when the PSA change has ended. Several options are possible for this.

In some embodiments, redundant sessions use a specific DNN. When a new PDU Session has been established to a given DNN, it is indicated to the Synch DB, and the corresponding lock is released. Note that in this case it is possible that an indication is sent to the Synch DB even when there has been no anchor change, e.g., when the PDU session is initially established. In that case there was no lock originally, so nothing needs to be released, so this does not cause a problem.

In some embodiments, redundant session use a specific combination of DNN and S-NSSAI (slice id); or just a specific S-NSSAI, and similarly as above, indicate to the Synch DB when a new PDU session has been established in the case of a given set of DNN, S-NSSAI combinations.

In some embodiments, besides the existing session ID, the terminal also assigns a new session identifier to the sessions, called here SSN for Session Sequence Number. The SSN is assigned by the UE in such a way that it remains the same as for the old session in the case of Alternative 2 and 3 when a new session is established due to PSA change, otherwise the SSN is changed. For example, in the case of Alternative 2, the same SSN is used for the new session as for the old session that was released and whose release triggered the new session. And in the case of Alternative 3, the same SSN is used for the new session as for the old session that triggered the establishment of the new session. When a new session is established, the SSN is provided to the Synch DB; in the case of a lock corresponding to a given SSN of the UE, the lock can be released when the new session is established with the same SSN for the UE. (In the case of Alternative 3, the old session may still exist when the new session is completed and the PSA change is regarded complete, however the existence of the old session this does not cause a problem if the new path is already operational.)

In some embodiments, it can also be possible that the SSN is provided by the AMF rather than the UE. When the AMF detects that a PDU Session is released and soon (within a present time period) a new PDU session is established to the same DDN, the AMF may regard this to be a PSA change and assign the same SSN. Also, if the AMF detects that a new PDU session was triggered for SSC mode 3, it may assign the same SSN for the new session as the triggering session.

Synch DB Options

Different options may be possible for realizing the logical Synch DB. In some embodiments, such as the one illustrated in FIGS. 8A and 8B, the Synch DB may be realized as a centralized function. It could be a standalone entity, or it could be co-located with other entities such as the UDM, NRF or NEF.

In some embodiments, the Synch DB may be a distributed function that is realized by multiple entities. For example, the Synch DB is implemented at each SMF (or at each SMF of a given network domain). Each time there is a change, it is signaled to all other SMFs. The distributed function is realized by a distributed database which is able to act as a logically single entity. That is, the database can resolve conflicts that concern the same UE when multiple changes are pending.

In some embodiments, the Synch DB may also be realized in the RAN by signaling between the RAN nodes for the two PDU Sessions. This is elaborated in the next section below.

RAN Based Synchronization

RAN based synchronization of the PSA change scheduling could be applied in cases when the two RAN nodes (such as gNBs) of the two PDU sessions are aware of each other. This is the case e.g., when dual connectivity based redundancy solution is applied, where one RAN node may be acting as a Master gNB and the other RAN node may be acting as a Secondary gNB, with Xn signaling connection between them. In the case of redundancy solution using multiple UEs, it might also be possible that the two gNBs where the UEs of the same device are connected are aware of each other, though this may not always be the case. For gNBs, there could be different cases. For example, where there is a single UE with dual connectivity, then the two gNBs already know each other, as they are for the same UE and they play the master and secondary gNB roles. On the other hand, where there are two different UEs, then some special identifier, such as a device id, may be used to pair the two gNBs and continuously update the mapping.

In this approach, it will become known to both gNBs that the PSA of one of the PDU sessions is being changed. While the change is taking place, a PSA change on another PDU session will be blocked. This approach is illustrated in FIGS. 9A and 9B.

Figure 9A:
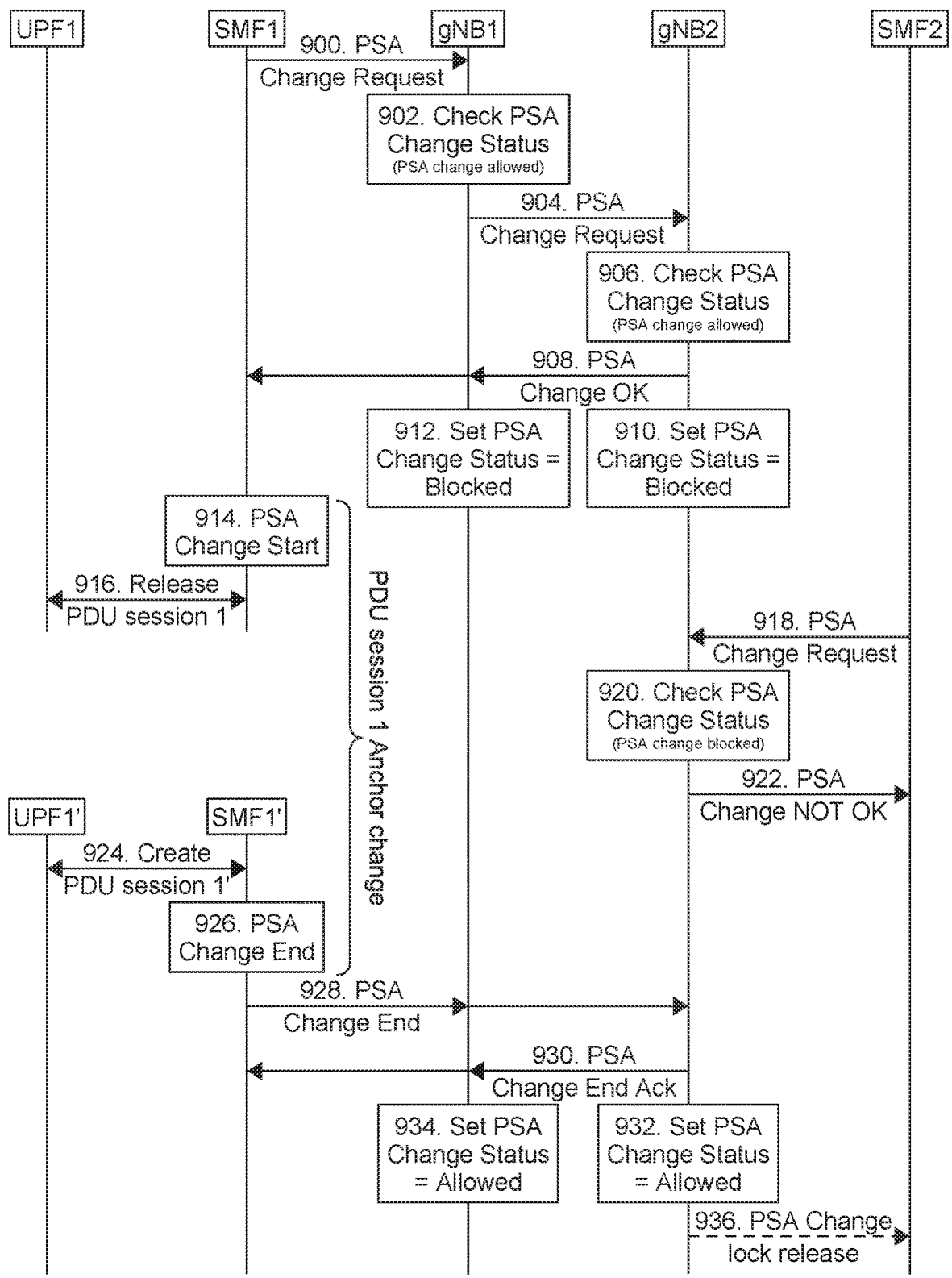
FIGS. 9A and 9B are signaling graphs showing messages exchanged during an exemplary process for coordinated change of PDU session anchors according to other embodiments of the present disclosure.
Figure 9B:
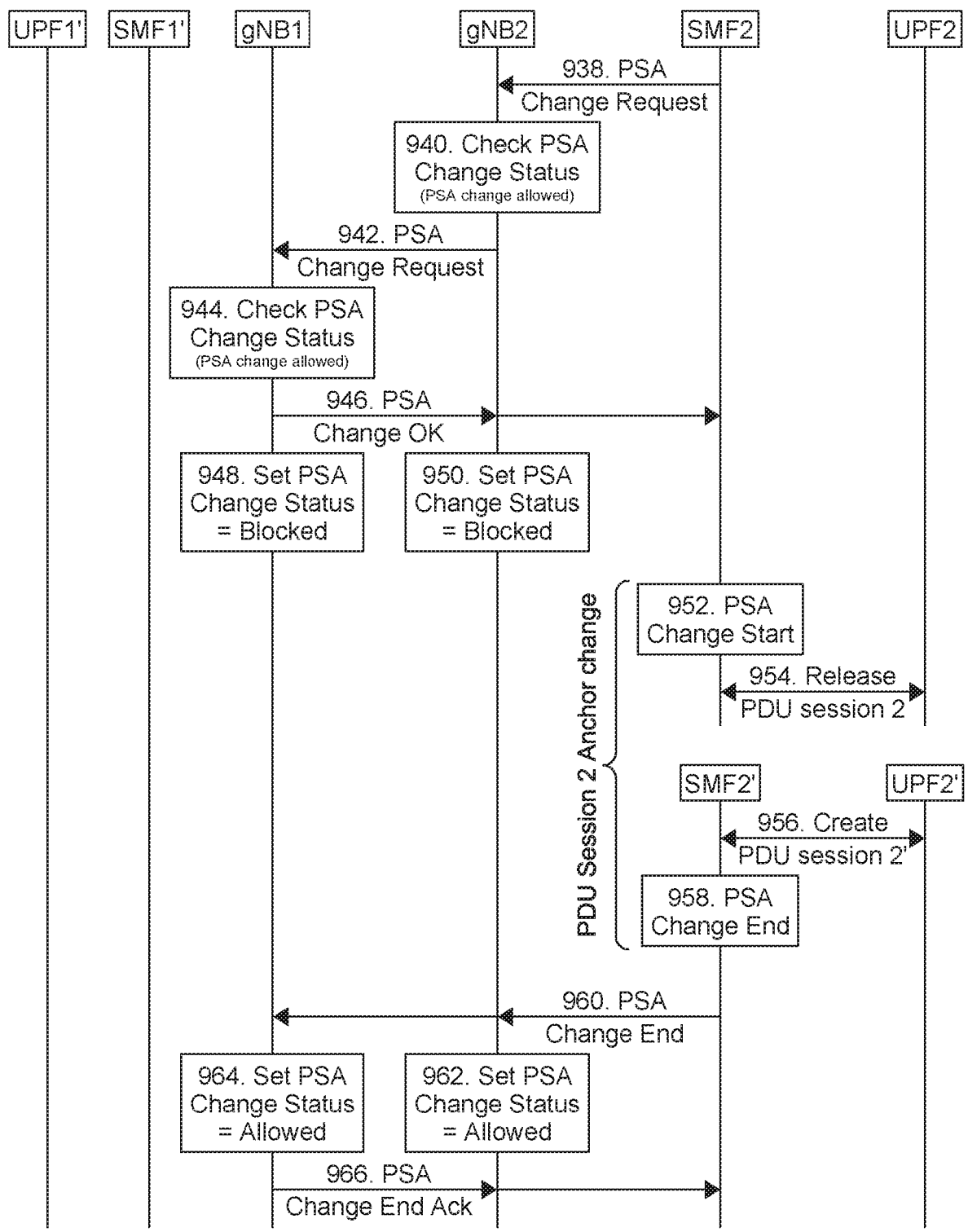

FIGS. 9A and 9B are signaling graphs showing messages exchanged during an exemplary process for coordinated change of PDU session anchors according to some embodiments of the present disclosure. FIGS. 9A and 9B are signaling charts involving SMF entities that are responsible for executing the anchor change processes and a distributed system for providing a locking function to avoid simultaneous anchor change. The process begins on FIG. 9A and continues on FIG. 9B.

In the embodiment illustrated in FIGS. 9A and 9B, the process includes the steps detailed below.

Step 900. A first SMF, SFM1, determines that a PSA is to be changed for a PDU Session, e.g., PDU session 1, between a first gNB, gNB1, and a first UPF, UPF1. SMF1 therefore signals this request to gNB1.

Step 902. gNB1 checks the PSA change status. In this example, PDU session 1 is not currently ongoing PSA change, and thus a PSA change for PDU session 1 is allowed. However, gNB1 knows that PDU session 1 is a redundant session with another PDU session, PDU session 2, between a second gNB, gNB2, and a second UPF, UPF2. In the embodiment illustrated in FIGS. 9A and 9B, gNB1 maintains the PSA change status for all related PDU sessions, e.g., gNB1 maintains the PSA change status for PDU session 1 and also for PDU session 2, even though PDU session 2 is with gNB2, not gNB1. Thus, in some embodiments, gNB1 already knows the last reported PSA change status for PDU session2. Nevertheless, in order to avoid a race condition in which a request for a PSA change to PDU session 1 and a request for a PSA change to PDU session 2 occur simultaneously, in the embodiment illustrated in FIGS. 9A and 9B, gNB1 notifies gNB2 that there has been a request to change the PSA for PDU session 1, so that if there is also a pending request to change the PSA for PDU session 2, gNB2 can warn gNB1 that there is a potential race condition so that gNB1 and gNB2 can negotiate which one of them gets to proceed with the PSA change and which one of them must wait.

Step 904. Thus, in the embodiment illustrated in FIG. 9A, gNB1 forwards the request to gNB2. It should be noted that the message sent by gNB1 to gNB2 in step 904 is not requesting that gNB2 perform a PSA change, but is instead intended to notify gNB2 that a PSA change of PDU session 1 has been requested and is pending. Because the message in step 904 identifies PDU session 1 as the target of a potential PSA change, gNB2 will know which PDU session will be affected—something that is particularly useful in cases where more than two PDU sessions are redundant with each other. In alternative embodiments, the message in step 904 need not be a PSA change request but may instead be another form of notification message or even a query message (e.g., to ask whether PDU session 2 is currently undergoing a PSA change or not).

Step 906. gNB2 checks the PSA change status. In this example, PDU session 2 is not currently undergoing a PSA change, and thus a PSA change for PDU session 1 is allowed. In alternative embodiments where, in step 904, gNB1 asks gNB2 about the status of PDU session 2 specifically, gNB2 may report to gNB1 that a PSA change of PDU session 2 is allowed, in which case gNB1 may infer that a PSA change of PDU session 1 is therefore not blocked.

Step 908. gNB2 notifies gNB1 that a PSA change for PDU session 1 is allowed, and so gNB1 can allow a PSA change for PDU session 1. gNB1 therefore notifies SMF1 that the PSA change for PDU session1 is allowed. At this point, both gNB1 and gNB2 are now aware that the PSA of the PDU session 1 will be changed. It is noted that steps 908, 910, and 912 can be performed in any order.

Step 910. Since PDU session 1 will be undergoing a PSA change, gNB2 sets the PSA change status for PDU session 2 to "blocked."

Step 912. Since PDU session 1 will be undergoing a PSA change, gNB1 sets the PSA change status for PDU session 1 to "blocked."

Step 914. The PSA change of the first PDU session, PDU session 1, is started.

Step 916. The UPF currently handling PDU session 1, UPF1, is released by SMF1.

Step 918. In the embodiment illustrated in FIG. 9A, while PDU session 1 is undergoing a PSA change, a second SMF, SMF2, also attempts to perform PSA change on PDU session 2 by sending a request to gNB2.

Step 920. gNB2 checks the PSA change status for PDU session 2.

Step 922. In the embodiment illustrated in FIG. 9A, because gNB2 is aware of the ongoing PSA change of the first PDU session, gNB2 rejects the PSA change of the second session, PDU session 2 (i.e., "NOT OK"), and does not forward that request to gNB1. In some embodiments, gNB2 may store the request for the PSA change.

Step 924. SMF1' creates a PDU session with UPF1'. This PDU session is called PDU session 1'.

Step 926. The PSA change for PDU session 1 ends. The PSA change of the first PDU session is then completed. In the example illustrated in FIGS. 9A and 9B, the SMF is changed from SMF1 to SMF1'.

Step 928. The end of the PSA change is indicated from SMF1' to gNB1, which forwards the notification to gNB2.

Step 930. gNB2 acknowledges the PSA change to gNB1, which forwards the acknowledgement to SMF1'.

Step 932. gNB2 sets the PSA change status for PDU session 2 to "allowed."

Step 934. gNB1 sets the PSA change status for PDU session 1 to "allowed." It is noted that steps 930, 932, and 934 may be performed in any order.

Step 936. In this optional step, based on gNB2's stored information that SMF2 requested a PSA change, gNB2 may notify SMF2 that the ongoing change has completed. (If this optional feature is not provided by gNB2, then SMF2 would have to repeatedly try to re-request the change).

The process continues in FIG. 9B. In the embodiment illustrated in FIG. 9B, the process includes the steps detailed below.

Step 938. SMF2 again requests a PSA change from gNB2 for a second PDU session, PDU session 2.

Step 940. gNB2 checks the PSA change status and determines that PDU session 2 is not currently undergoing a PSA change.

Step 942. Because gNB2 knows that PDU session 2 and PDU session 1 are redundant PDU sessions, and that PDU session 1 is through gNB1, gNB2 forwards the request to gNB1.

Step 944. gNB1 checks the PSA change status and determines that PDU session 1 is not currently undergoing a PSA change.

Step 946. gNB1 sends a PSA change OK message to gNB2, which forwards that message to SMF2. At this point, both gNB2 and gNB1 are now aware that the PSA of the second PDU session is being changed.

Step 948. gNB1 sets the PSA change status for PDU session 1 to "blocked."

Step 950. gNB2 sets the PSA change status for PDU session 2 to "blocked." It is noted that steps 946, 948, and 950 may be performed in any order.

Step 952. The PSA change for the second PDU session is started.

Step 954. SMF2 releases the PDU session with UPF2 (PDU session 2).

Step 956. SMF2' creates a PDU session with UPF2' (PDU session 2').

Step 958. The PSA change for the second PDU session ends.

Step 960. SMF2' signals the end of the PSA change to gNB2 and gNB1, hence gNB2 and gNB1 will become aware that the process is finished, and new PSA change processes may be allowed.

Step 962. gNB2 sets the PSA change status for PDU session 2 to "allowed."

Step 964. gNB1 sets the PSA change status for PDU session 1 to "allowed."

Step 966. The end of the PSA change is acknowledged by gNB1 and gNB2.

It is noted that steps 962, 964, and 966 may be performed in any order.

A possible issue that may arise is a race condition between gNB1 and gNB2 when both PDU Sessions request PSA change at the same time. In that case it may happen that both gNB1 and gNB2 send a message to the other gNB for a PSA Change Request. To resolve such race conditions, a conflict resolution needs to be agreed in advance which request to accept in the case of simultaneous requests. (Simultaneous requests would mean that a gNB gets a new request for PSA change while its own request for PSA change is pending, i.e., sent to the other gNB and waiting for an answer.) There could be several such rules which uniquely determine which gNB should win such race conditions. Example rules include, but are not limited to, rules such as: always the Master gNB should win in the case of dual connectivity; or always the gNB with a higher identity number; or always the PDU Session with a higher session id, and so on. Other conflict resolution techniques could also be possible.

Delayed Handovers in RAN

The PSA change of a PDU Session causes temporary outages or change in the delay for that PDU Session. Therefore, it is important that the other PDU Session can remain operational and unaffected, so that at least one of the PDU Sessions can continuously deliver user data uninterrupted. For that reason, it can be advantageous to temporarily postpone handovers on the other PDU sessions, since handovers in RAN can also lead to temporary disruptions in the delivery of user plane data. For example, in case PSA change is indicated for a first PDU Session, the handovers are temporarily postponed on the other PDU Session. An example of this is shown in FIG. 10.

Figure 10:
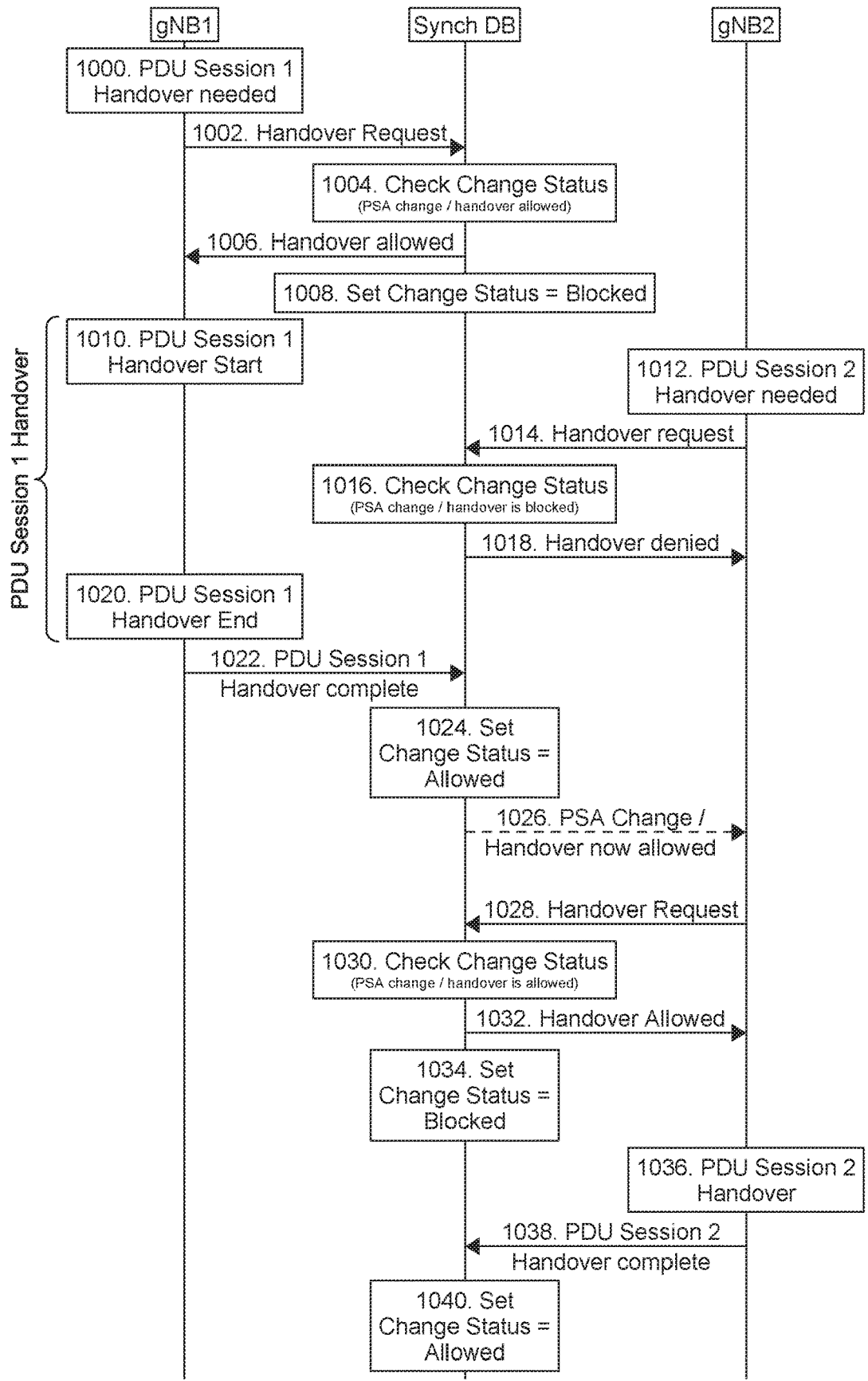
FIG. 10 is a signaling graph showing messages exchanged during an exemplary process for coordinated change of PDU session anchors and/or handovers according to some embodiments of the present disclosure.

FIG. 10 is a signaling graph showing messages exchanged during an exemplary process for coordinated change of PDU session anchors and/or handovers according to some embodiments of the present disclosure. In the embodiment illustrated in FIG. 10, the process includes the following steps.

Step 1000. A first gNB, gNB1, determines that a handover involving a PDU session that is being handled by gNB1, PDU session 1, is needed. In the embodiment illustrated in FIG. 10, PDU session 1 and PDU session 2, which is being handled by a second gNB, gNB2, are redundant sessions.

Step 1002. gNB1 sends, to a centralized node for maintaining PSA change/handover status for PDU sessions, Synch DB, a handover request for PDU session 1.

Step 1004. In the embodiment illustrated in FIG. 10, Synch DB determines that a change is allowed, i.e., neither PDU session 1 nor PDU session 2 are currently undergoing a PSA change or a handover.

Step 1006. Synch DB notifies gNB1 that a handover for PDU session 1 is allowed.

Step 1008. Synch DB sets the change status associated with PDU session 1 to "blocked."

Step 1010. gNB1 begins the handover process.

Step 1012. In the embodiment illustrated in FIG. 10, while the handover involving PDU session 1 is in progress, gNB2 determines that a handover involving PDU session 2 is needed.

Step 1014. gNB2 sends Synch DB a handover request for PDU session 2.

Step 1016. In the embodiment illustrated in FIG. 10, Synch DB determines that a PSA change/handover is blocked, e.g., because PDU session 1 is currently undergoing a handover.

Step 1018. Synch DB notifies gNB2 that a handover for PDU session 2 is not allowed.

Step 1020. gNB1 completes the handover involving PDU session 1.

Step 1022. gNB1 notifies Synch DB that the handover involving PDU Session 1 is complete.

Step 1024. Synch DB sets a change status associated with PDU session 1 to "allowed."

Step 1026. In this optional step, Synch DB notifies gNB2 that a PSA change or handover is now allowed for PDU session 2.

Step 1028. gNB2 again sends Synch DB a handover request for PDU session 2.

Step 1030. Synch DB determines that a PSA change/handover is allowed.

Step 1032. Synch DB notifies gNB2 that a handover for PDU session 2 is allowed.

Step 1034. Synch DB sets a change status associated with PDU session 2 to "blocked."

Step 1036. gNB2 performs a handover involving PDU session 2.

Step 1038. gNB2 notifies Synch DB that the handover involving PDU session 2 is complete.

Step 1040. Synch DB sets a change status associated with PDU session 2 to "allowed."

Figure 11:
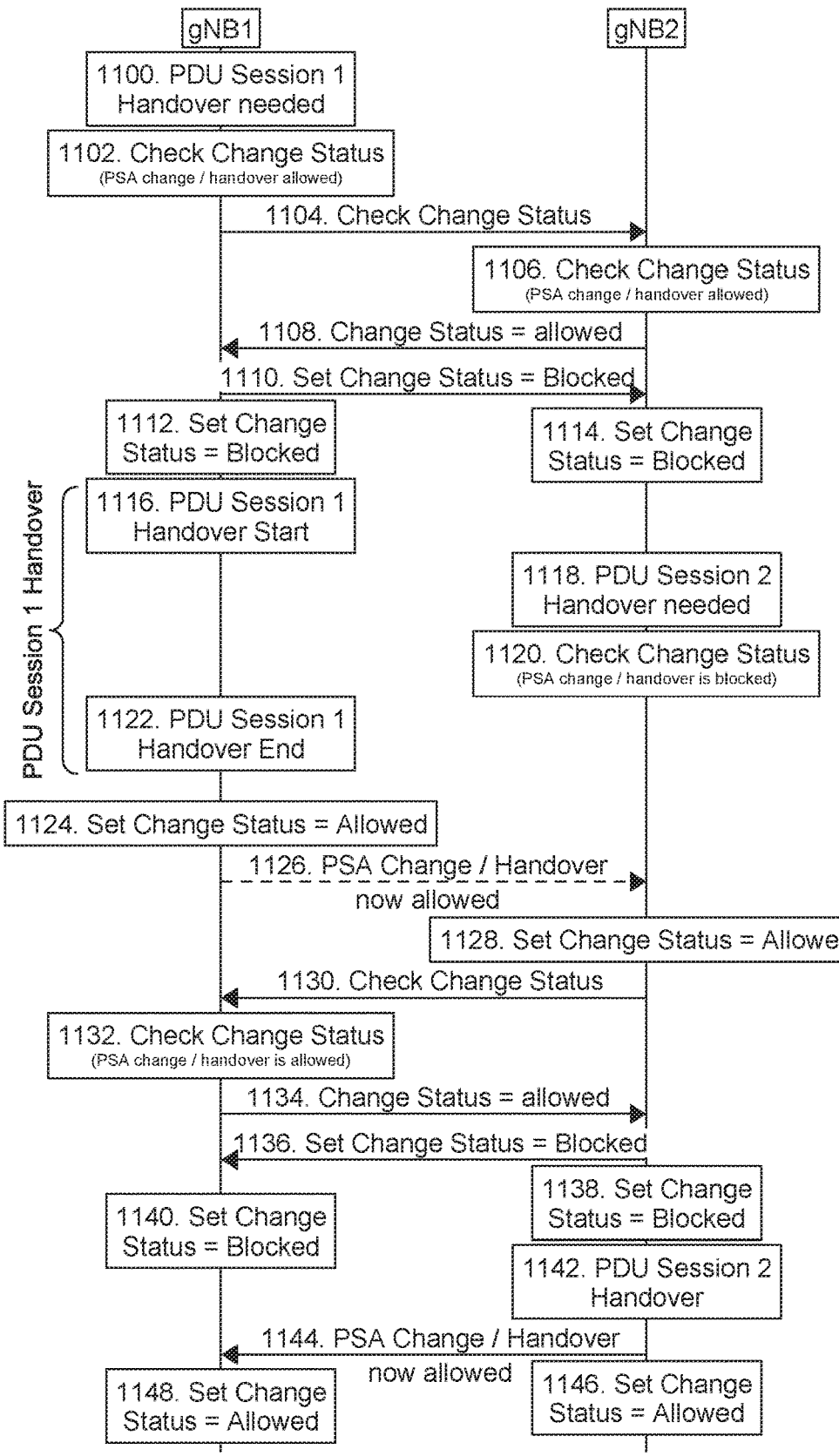
FIG. 11 is a signaling graph showing messages exchanged during an exemplary process for coordinated change of PDU session anchors and/or handovers according to other embodiments of the present disclosure.

FIG. 11 is a signaling graph showing messages exchanged during an exemplary process for coordinated change of PDU session anchors and/or handovers according to other embodiments of the present disclosure. In the embodiment illustrated in FIG. 11, the process includes the following steps.

Step 1100. A first gNB, gNB1, determines that a handover involving a PDU session that is being handled by gNB1, PDU session 1, is needed. In the embodiment illustrated in FIG. 10, PDU session 1 and PDU session 2, which is being handled by a second gNB, gNB2, are redundant sessions.

Step 1102. gNB1 checks a change status associated with PDU session 1. In the embodiment illustrated in FIG. 11, a PSA change or handover is allowed, e.g., because PDU session 1 is not currently undergoing a PSA change or a handover.

Step 1104. gNB1 knows that PDU session 1 is a redundant session with PDU session 2, so gNB1 queries gNB2 to check a change status associated with PDU session 2.

Step 1106. In the embodiment illustrated in FIG. 11, gNB2 determines that a PSA change or handover is allowed, e.g., because PDU session 2 is not currently undergoing a PSA change or a handover.

Step 1108. gNB2 notifies gNB1 that a PSA change or handover is allowed for PDU session 2.

Step 1110. gNB1 notifies gNB2 that a PSA change or handover for PDU session 1 is blocked, i.e., because a handover will be performed.

Step 1112. gNB1 sets the change status associated with PDU session 1 to "blocked."

Step 1114. gNB1 sets the change status associated with PDU session 1 to "blocked." It is noted that steps 1112 and 1114 may be performed in any order.

Step 1116. gNB1 begins the handover process.

Step 1118. In the embodiment illustrated in FIG. 11, while the handover involving PDU session 1 is in progress, gNB2 determines that a handover involving PDU session 2 is needed.

Step 1120. gNB2 checks the change status, determines that PSA change or handover for PDU session 2 is blocked, i.e., because PDU session 1 is currently undergoing a handover.

Step 1122. gNB1 completes the handover involving PDU session 1.

Step 1124. gNB1 sets a change status associated with PDU session 1 to "allowed."

Step 1126. In this optional step, gNB1 notifies gNB2 that a PSA change or handover is now allowed for PDU session 1.

Step 1128. Knowing that PDU session 1 is redundant with PDU session 2, gNB2 sets a change status associated with PDU session 2 to "allowed."

Step 1130. gNB2 queries gNB1 to check on a change status associated with PDU session 1.

Step 1132. gNB1 determines that a PSA change/handover of PDU session 1 is allowed.

Step 1134. gNB1 signals to gNB2 that a PSA change or handover for PDU session 1 is allowed.

Step 1136. gNB2 signals to gNB1 that a PSA change or handover for PDU session 2 is blocked, i.e., because a handover for PDU session 2 will be performed.

Step 1138. gNB2 sets a change status associated with PDU session 2 to "blocked."

Step 1140. gNB1 sets a change status associated with PDU session 1 to "blocked."

Step 1142. gNB2 performs a handover involving PDU session 2.

Step 1144. gNB2 notifies gNB1 that a PSA change or handover for PDU session 2 is not allowed.

Step 1146. gNB2 sets a change status associated with PDU session 2 to "allowed."

Step 1148. gNB1 sets a change status associated with PDU session 1 to "allowed."

The RAN based synchronization approach gives a good solution for this, since the PSA change is also signaled to the gNB of the other PDU Session. Therefore, in case a gNB is aware that a PSA change is taking place on the other PDU session, it temporarily tries to postpone handovers. Note that in case the radio link quality deteriorates below a certain level, it may be necessary to perform the handover anyway, but in many cases it could be possible to postpone the handover for a limited period of time.

Similarly, it may be preferable to delay/postpone the PSA change while a handover is ongoing in RAN. In the signaling sequence above, for example, if gNB1 is aware that a handover is ongoing for the other PDU session, gNB1 may postpone the PSA change. This could be done by waiting with the signaling to gNB2 until the handover is completed; or alternatively informing SMF1 to re-try later (where it is possible to specify a retry interval as well). Also, it is possible to postpone the PSA change if a handover is ongoing for the given session rather than the other session.

Figure 12:
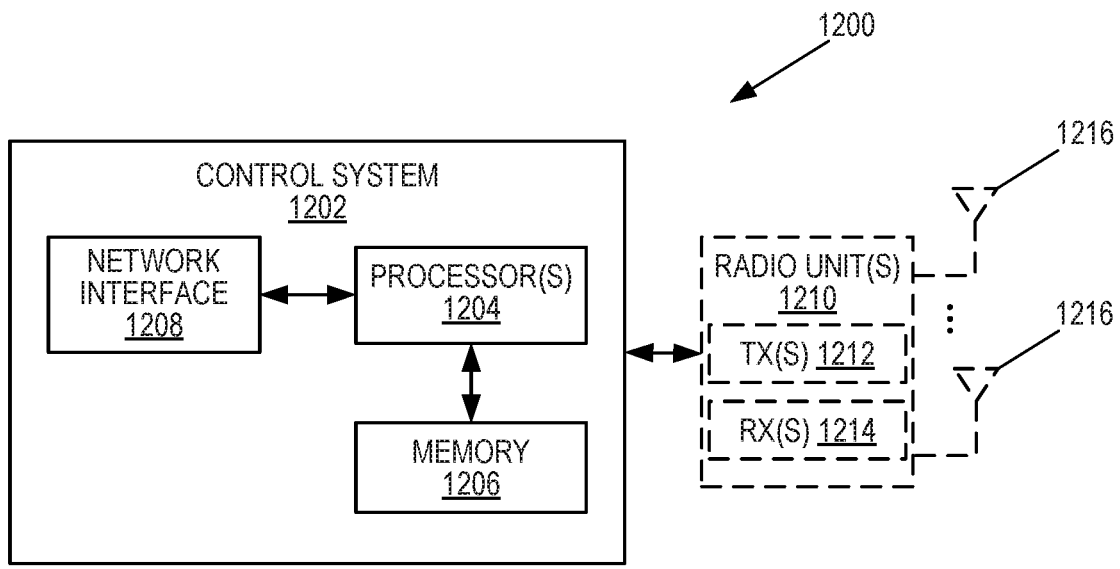
FIG. 12 is a schematic block diagram of a radio access node according to some embodiments of the present disclosure.

FIG. 12 is a schematic block diagram of a network node 1200 according to some embodiments of the present disclosure. The network node 1200 may be, for example, a radio access node, such as a base station 402 or 406, or a core network node. As illustrated, the network node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the network node 1200 optionally includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a network node 1200 as described herein. In some embodiments, the function(s) are implemented in software that is stored, e.g., in the memory 1206 and executed by the one or more processors 1204.

Figure 13:
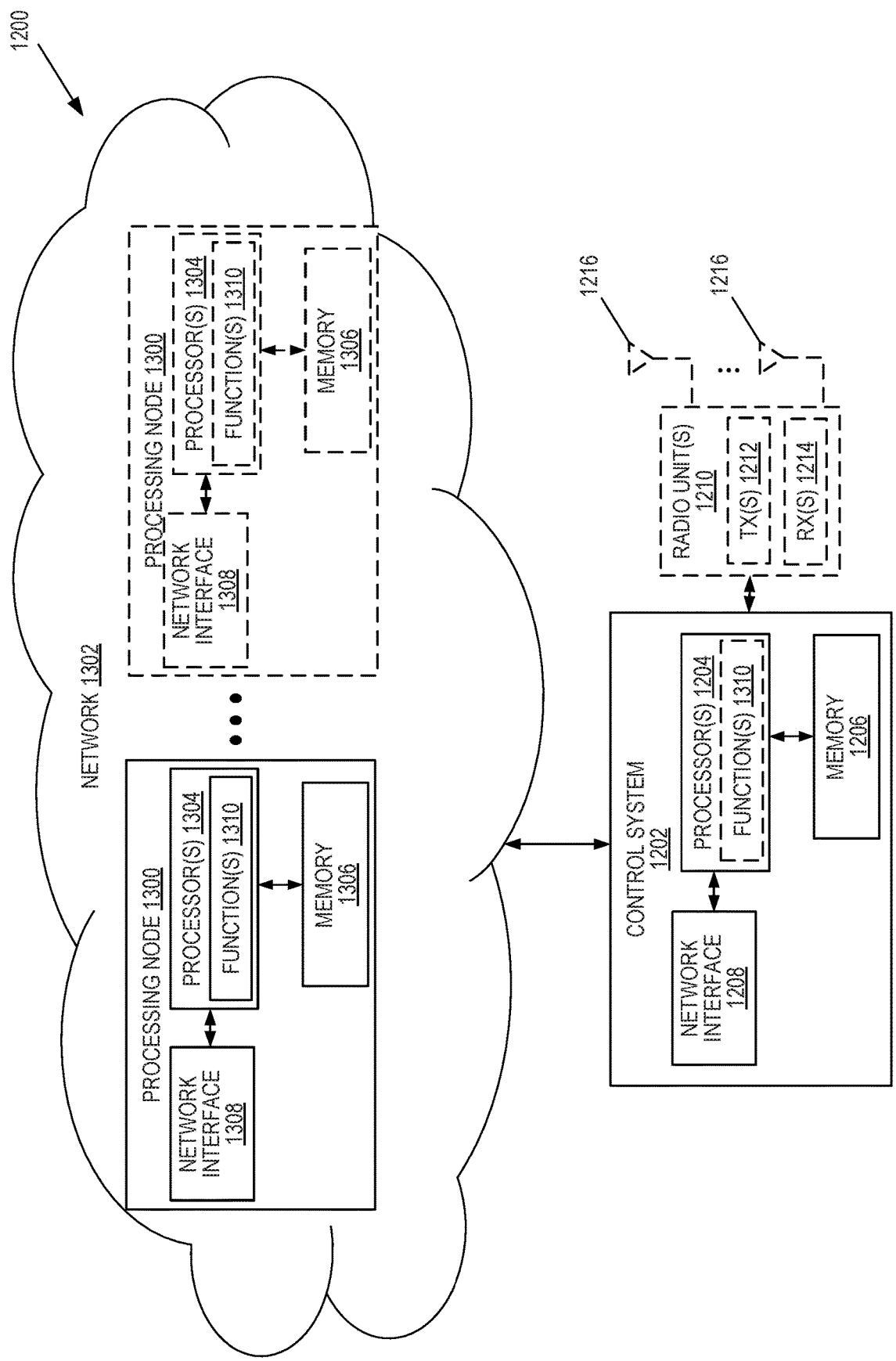
FIG. 13 is a schematic block diagram that illustrates a virtualized embodiment of the radio access node of FIG. 12 according to some embodiments of the present disclosure.

FIG. 13 is a schematic block diagram that illustrates a virtualized embodiment of the network node 1200 according to some embodiments of the present disclosure. This discussion is equally applicable to other types of network nodes. Further, other types of network nodes may have similar virtualized architectures.

As used herein, a "virtualized" radio access node is an implementation of the network node 1200 in which at least a portion of the functionality of the network node 1200 is implemented as a virtual component(s) (e.g., via a virtual machine(s) executing on a physical processing node(s) in a network(s)). As illustrated, in this example, the network node 1200 includes the control system 1202 that includes the one or more processors 1204 (e.g., CPUs, ASICs, FPGAs, and/or the like), the memory 1206, and the network interface 1208 and the one or more optional radio units 1210 that each includes the one or more transmitters 1212 and the one or more receivers 1214 coupled to the one or more antennas 1216, as described above. The control system 1202 may be connected to the optional radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the network node 1200 described herein are implemented at the one or more processing nodes 1300 or distributed across the control system 1202 and the one or more processing nodes 1300 in any desired manner. In some particular embodiments, some or all of the functions 1310 of the network node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of network node 1200 or a node (e.g., a processing node 1300) implementing one or more of the functions 1310 of the network node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
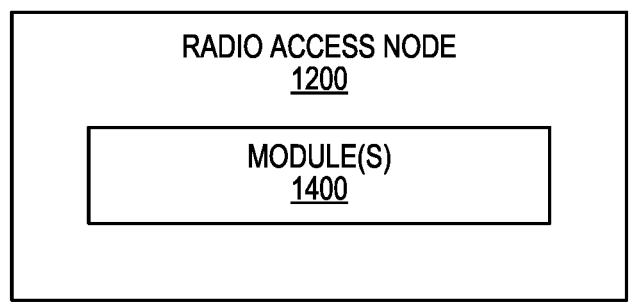
FIG. 14 is a schematic block diagram of the radio access node of FIG. 12 according to some other embodiments of the present disclosure.

FIG. 14 is a schematic block diagram of the network node 1200 according to some other embodiments of the present disclosure. The network node 1200 includes one or more modules 1400, each of which is implemented in software. The module(s) 1400 provide the functionality of the network node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
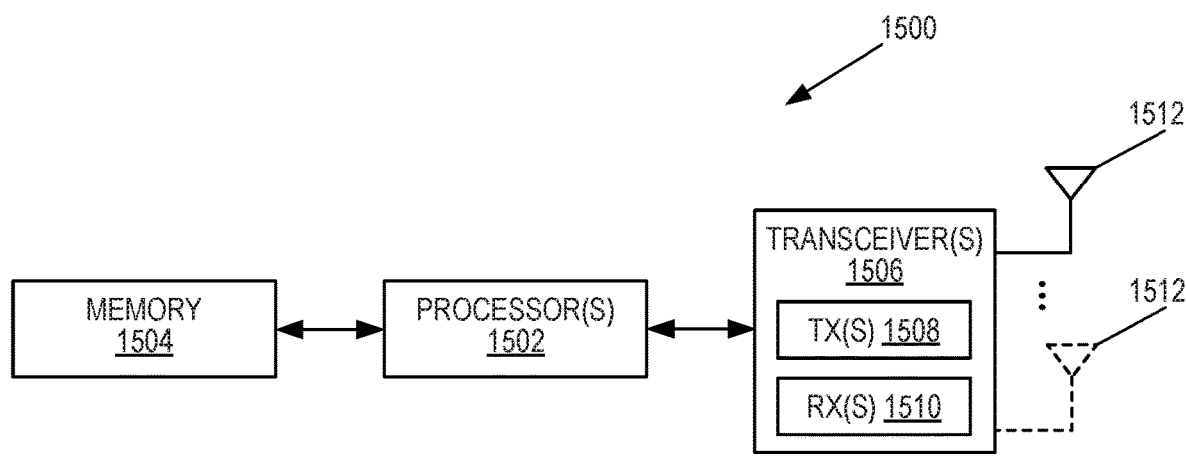
FIG. 15 is a schematic block diagram of a User Equipment device (UE) according to some embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
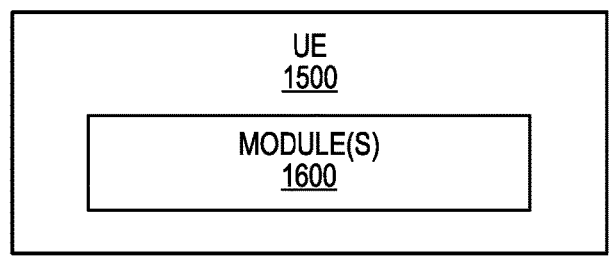
FIG. 16 is a schematic block diagram of the UE of FIG. 15 according to some other embodiments of the present disclosure.

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Figure 17:
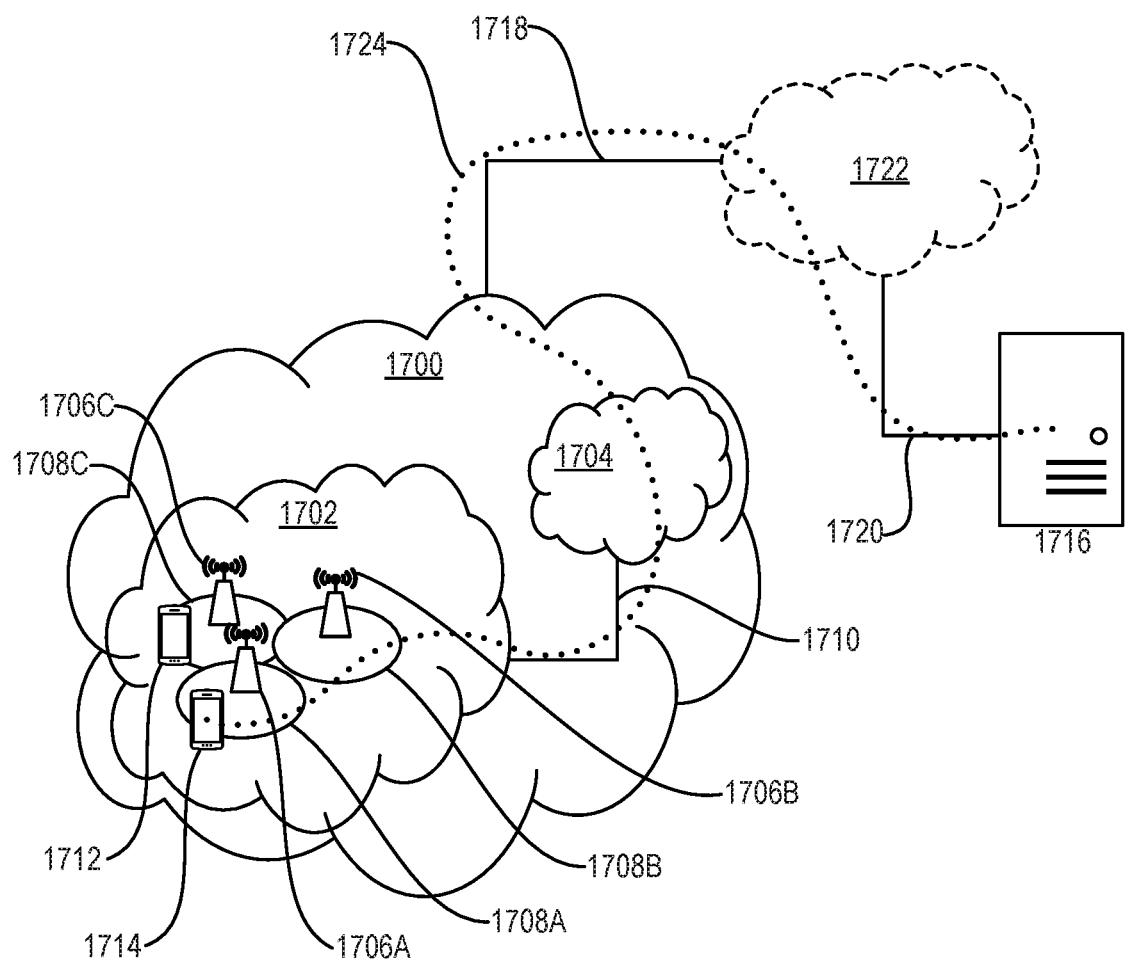
FIG. 17 illustrates a telecommunication network connected via an intermediate network to a host computer in accordance with some embodiments of the present disclosure.

FIG. 17 illustrates a telecommunication network connected via an intermediate network to a host computer in accordance with some embodiments of the present disclosure. In the embodiment illustrated in FIG. 17, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as Node Bs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Figure 18:
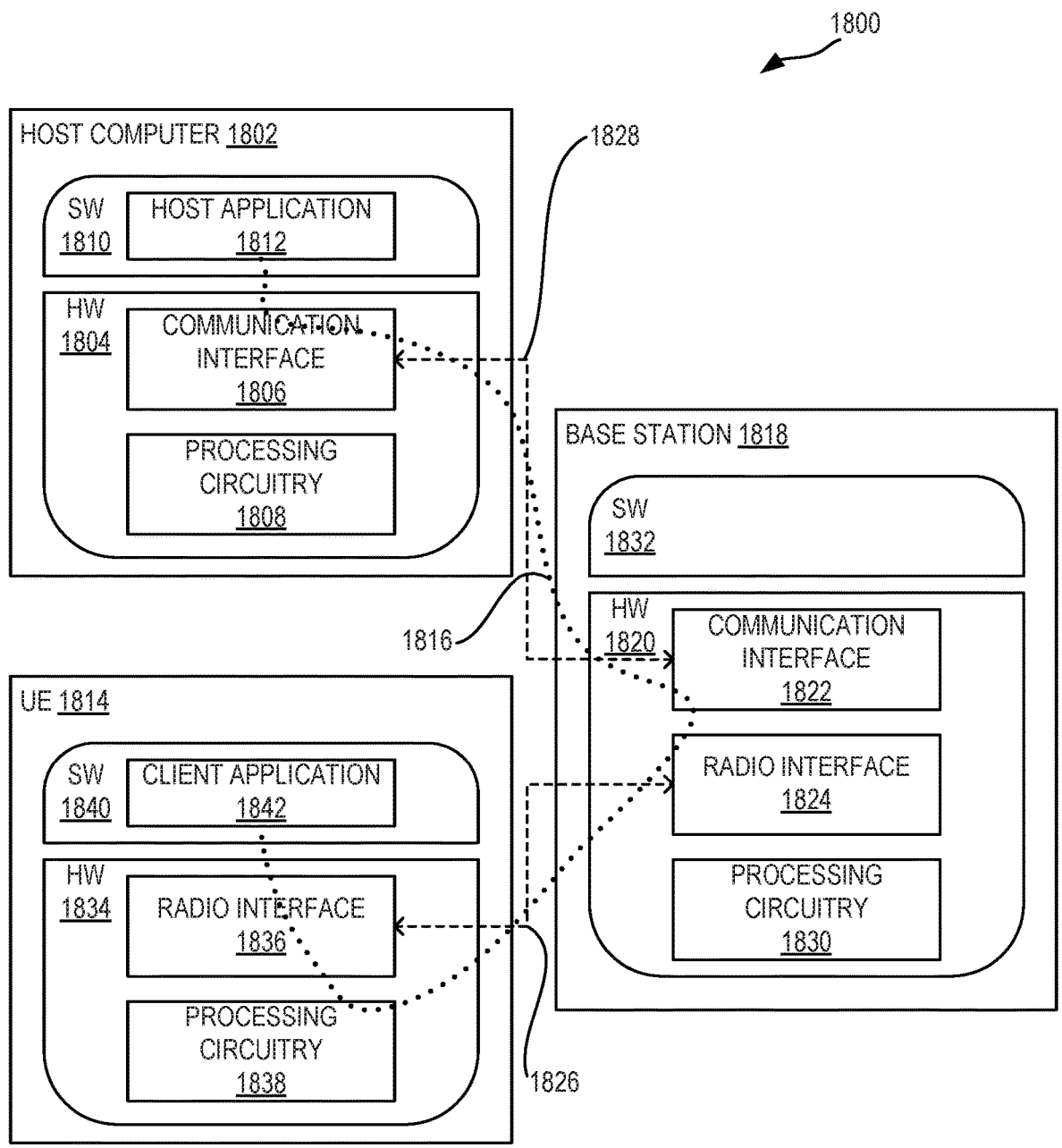
FIG. 18 is a generalized block diagram of a host computer communicating via a base station with a UE over a partially wireless connection in accordance with some embodiments of the present disclosure.

FIG. 18 is a generalized block diagram of a host computer communicating via a base station with a UE over a partially wireless connection in accordance with some embodiments of the present disclosure. Example implementations, in accordance with an embodiment, of the UE, base station, and host computer discussed in the preceding paragraphs will now be described with reference to FIG. 18. In the embodiment illustrated in FIG. 18, in a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. More precisely, the teachings of these embodiments coordinate the change of PSAs for redundant user plane paths and thereby provide benefits such as increased stability in dual-connectivity scenarios.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer's 1802 measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

Figures 19, 20:
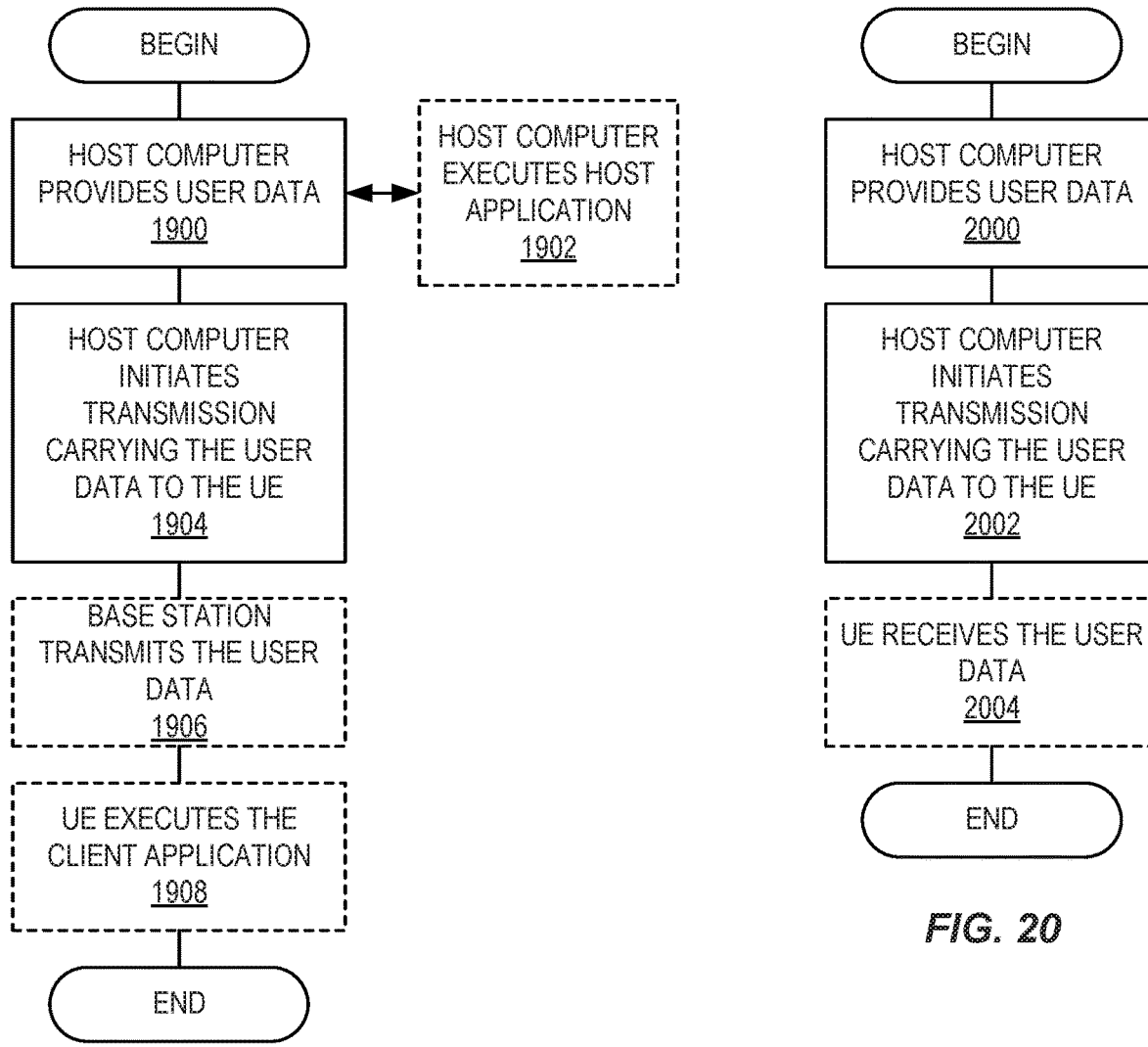
FIG. 19 is a flowchart illustrating a method implemented in a communication system in accordance with one embodiment of the present disclosure.
FIG. 20 is a flowchart illustrating a method implemented in a communication system in accordance with one embodiment of the present disclosure.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

Figures 21, 22:
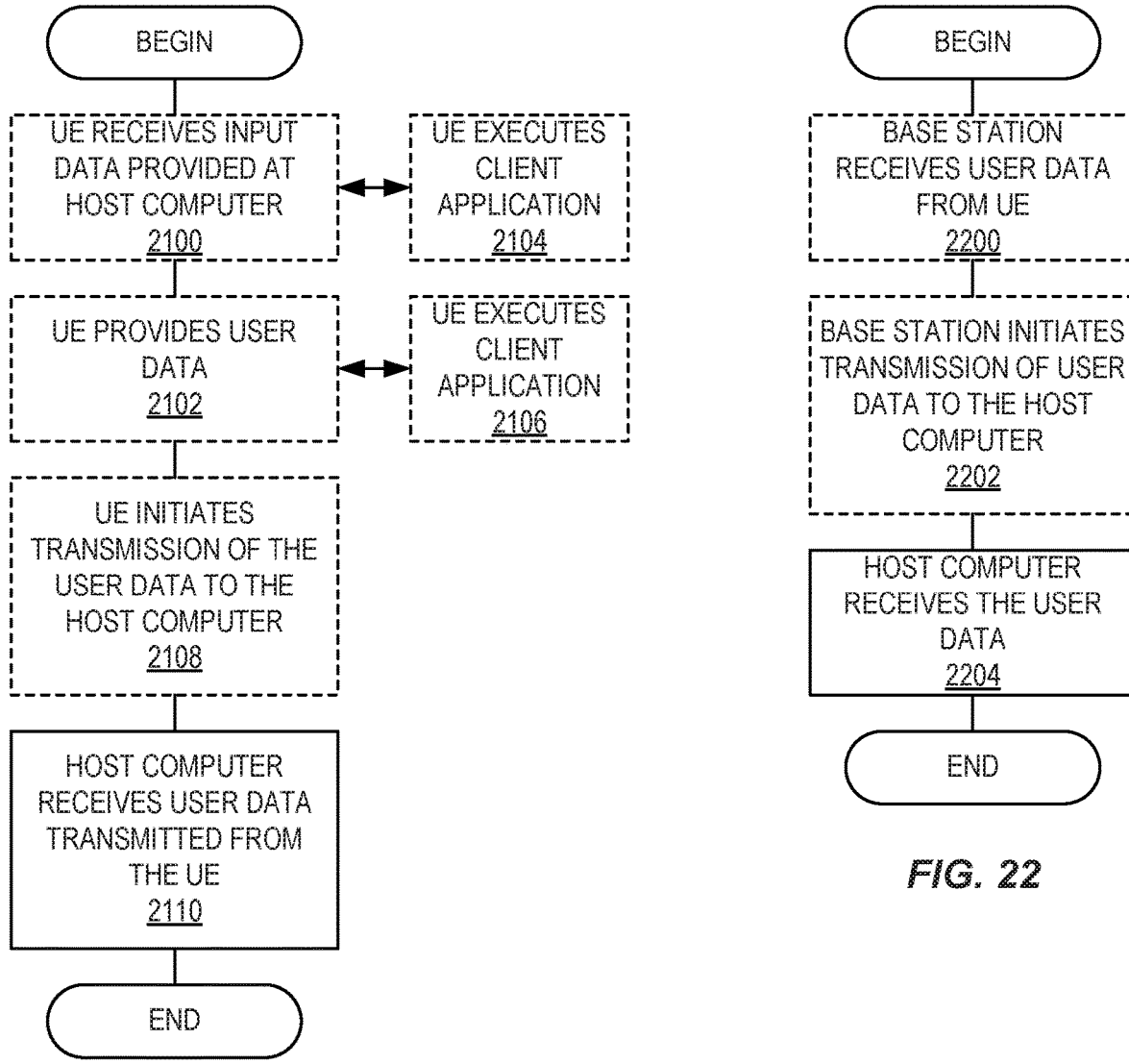
FIG. 21 is a flowchart illustrating a method implemented in a communication system in accordance with one embodiment of the present disclosure.
FIG. 22 is a flowchart illustrating a method implemented in a communication system in accordance with one embodiment of the present disclosure.

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Advantages of the Present Subject Matter

The methods and systems of the present disclosure facilitate maintaining redundant paths in the case of mobile devices. As the anchor point is changed on one of the paths only, the other path can carry data uninterrupted. Once the anchor point change completes on one path, the roles can be reversed and the anchor point can be changed on the other path if necessary. By taking anchor change processes one at a time, critical applications may remain uninterrupted.

Methods and systems according to the present disclosure can allow anchor change to take place, whereas in conventional systems, solution critical applications may otherwise choose to not perform anchor change. As a result of the possibility of anchor change, the end-to-end paths can become shorter, which reduces the end-to-end latency. Additionally, shorter end-to-end paths lead to less failure opportunities on the way, and thereby improving the communication systems availability. Also, by allowing the flexibility to do anchor change with the related path modification, it may be possible to maintain redundant paths, when otherwise such redundant paths might not be available with too distant anchor points.

GLOSSARY

At least some of the following abbreviations may be used in this disclosure. If there is an inconsistency between abbreviations, preference should be given to how it is used above. If listed multiple times below, the first listing should be preferred over any subsequent listing(s).

3G Third Generation
3GPP Third Generation Partnership Project
4G Fourth Generation
5G Fifth Generation
5GC Fifth Generation Core Network
5GS Fifth Generation System
AF Application Function
AGV Automated Guided Vehicles
AMF Access and Mobility management Function
AN Access Network
AP Access Point
ASIC Application Specific Integrated Circuit
AUSF Authentication Server Function
BS Base Station
C-MTC Critical Machine Type Communication
CN Core Network
CP Control Plane
CPU Central Processing Unit
DC Dual Connectivity
DETN ET Deterministic Networking
DN Data Network
DNN Data Network Name
DSP Digital Signal Processor
EMBB Enhanced Mobile Broadband
eNB Enhanced or Evolved Node B
EPC Evolved Packet Core Network
EPS Evolved Packet System
FPGA Field Programmable Gate Array
FRER Frame Replication and Elimination for Redundancy
GHz Gigahertz
gNB New Radio Base Station
HSS Home Subscriber Server
IEEE Institute of Electrical and Electronic Engineers
IETF Internet Engineering Task Force
IoT Internet of Things
IP Internet Protocol
ITS Intelligent Traffic System
LTE Long Term Evolution
MgNB Master gNB
MIMO Multiple Input Multiple Output
MME Mobility Management Entity
M-MTC Massive Machine Type Communication
MTC Machine Type Communication
NEF Network Exposure Function
NF Network Function
NG-RAN Next Generation Radio Access Network
NR New Radio
NRF Network Function Repository Function
NSSF Network Slice Selection Function
OTT Over-the-Top
PCF Policy Control Function
PDU Protocol Data Unit
P-GW/PGW Packet Data Network Gateway
PSA PDU Session Anchor
QoS Quality of Service
RAM Random Access Memory
RAN Radio Access Network
RAT Radio Access Technology
RF Radio Frequency
ROM Read Only Memory
RRH Remote Radio Head
RSN Redundancy Sequence Number
RTT Round Trip Time
SCEF Service Capability Exposure Function
SgNB Secondary gNB
SMF Session Management Function
S-NSSAI Single Network Slice Selection Assistance Information
SSC Session and Service Continuity
SUPI Subscription Permanent Identifier
TS Technical Specification
TSN Time-Sensitive Networking
UDM User Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

What is claimed is:

1. A method for coordinated change of Protocol Data Unit (PDU) Session Anchors (PSAs) the method comprising:
    at a node for maintaining PSA change status for PDU sessions:
        receiving, from a requesting entity, a request for a PSA change for a first PDU session having a first PSA, where the first PDU session and a second PDU session are redundant PDU sessions with each other;
        determining whether the PSA change for the first PDU session is temporarily prohibited;
        upon determining that the PSA change for the first PDU session is temporarily prohibited,
        denying the request for the PSA change for the first PDU session; and
        upon determining that the PSA change for the first PDU session is not temporarily prohibited:
            granting the request for the PSA change for the first PDU session;
            setting a PSA change status associated with the first PDU session to indicate that the PSA change for the first PDU session is temporarily prohibited;
            subsequently receiving an indication that the PSA change for the first PDU session is completed; and
            setting the PSA change status associated with the first PDU session to indicate that the PSA change for the first PDU session is allowed,
        wherein determining that the PSA change for the first PDU session is temporarily prohibited comprises at least one of: determining that the first PDU session is currently undergoing a handover; determining that the second PDU session is currently undergoing a handover; and/or determining that the second PDU session is currently undergoing a PSA change.

2. The method of claim 1, wherein the PSA change status associated with the first PDU session is also associated with the second PDU session.

3. The method of claim 1, wherein:
setting the PSA change status associated with the first PDU session to indicate that the PSA change for the first PDU session is temporarily prohibited further comprises setting a PSA change status associated with the second PDU session to indicate that a PSA change for the second PDU session is temporarily prohibited, and
setting the PSA change status associated with the first PDU session to indicate that the PSA change for the first PDU session is allowed further comprises setting the PSA change status associated with the second PDU session to indicate that the PSA change for the second PDU session is allowed.

4. The method of claim 1, wherein the node for maintaining PSA change status for PDU sessions comprises a synchronization database function for maintaining PSA change status variables that indicate PSA change status for PDU sessions.

5. The method of claim 1, further comprising, subsequent to denying the request for the PSA change for the first PDU session:
determining that the PSA change for the first PDU session is allowed; and
setting the PSA change status associated with the first PDU session to indicate that the PSA change is allowed; and/or
notifying the requesting entity that the PSA change for the first PDU session is now allowed.

6. The method of claim 1, wherein a requesting entity comprises a Session Management Function (SMF) that is associated with the PSA that is being changed; and/or wherein the first node being associated with the first PDU session comprises a Radio Access Network (RAN) node; wherein optionally the RAN node comprises a New Radio Base Station (gNB).

7. The method of claim 1, wherein the second node being associated with the second PDU session comprises a RAN node; wherein optionally the RAN node comprises a gNB.

8. A method for coordinated change of Protocol Data Unit (PDU) Session Anchors (PSAs), the method comprising:
at a Session Management Function (SMF), node:
determining that a PSA change is needed for a first PDU session having a first PSA, where the first PDU session and a second PDU session are redundant PDU sessions with each other;
sending, to a node for maintaining PSA change status for PDU sessions, a request for the PSA change for the first PDU session;
receiving, from the node for maintaining PSA change status for PDU sessions, a response to the request for the PSA change for the first PDU session, and:
if the response to the request for the PSA change for the first PDU session indicates that the PSA change is allowed, initiating the PSA change for the first PDU session; and
if the response to the request for the PSA change for the first PDU session indicates that the PSA change is temporarily prohibited, not initiating the PSA change for the first PDU session.

9. The method of claim 8 wherein, if the response to the request for the PSA change for the first PDU session indicates that the PSA change is temporarily prohibited, the process further comprises:
receiving a notification that the temporarily prohibited PSA change is now allowed; and
resending the request for the PSA change for the first PDU session to the node for maintaining PSA change status for PDU sessions.

10. The method of claim 8, wherein sending the request for the PSA change for the first PDU session to the node for maintaining PSA change status for PDU sessions comprises sending the request to a core network node; or wherein sending the request for the PSA change for the first PDU session to the node for maintaining PSA change status for PDU sessions comprises sending the request to a Radio Access Network (RAN) node; wherein optionally said sending the request to the RAN node comprises sending the request to a New Radio Base Station (gNB).

11. The method of claim 8, further comprising:
at a Session Management Function (SMF) node:
performing a PSA change for a PDU session having a first PSA; and
sending, to a node for maintaining PSA change status for PDU sessions, an indication that the PSA change for the first PDU session has completed.

12. The method of claim 11, wherein performing the PSA change for the first PDU session having the first PSA comprises creating a new PDU session having a second PSA that is different from the first PSA; and/or
wherein the node for maintaining PSA change status for PDU sessions comprises a core network node; or
wherein the node for maintaining PSA change status for PDU sessions comprises a Radio Access Network, RAN, node; wherein optionally the RAN node comprises a New Radio Base Station, gNB.

13. A method for coordinated change of Protocol Data Unit (PDU) Session Anchors (PSAs), the method comprising:
at a node for maintaining PSA change and handover status for PDU sessions:
receiving a request for a handover for a first PDU session having a first PSA, where the first PDU session and a second PDU session are redundant PDU sessions with each other;
determining whether the handover for the first PDU session is temporarily prohibited;
upon determining that the handover for the first PDU session is temporarily prohibited, denying the request for the handover for the first PDU session; and
upon determining that the handover for the first PDU session is not temporarily prohibited:
allowing the handover for the first PDU session;
setting a change status associated with the first PDU session to indicate that a PSA change or handover for the first PDU session is temporarily prohibited;
subsequently receiving an indication that the PSA change for the first PDU session is completed; and
setting the change status associated with the first PDU session to indicate that a PSA change for the first PDU session is allowed,
wherein determining that the handover for the first PDU session is temporarily prohibited comprises at least one of: determining that the first PDU session is currently undergoing a PSA change; determining that the second PDU session is currently undergoing a handover; and/or determining that the second PDU session is currently undergoing a PSA change.

14. The method of claim 13, wherein the change status associated with the first PDU session is also associated with the second PDU session.

15. The method of claim 14, wherein:
   setting a change status associated with the first PDU session to indicate that a PSA change or handover for the first PDU session is temporarily prohibited further comprises setting a change status associated with the second PDU session to indicate that a PSA change or handover for the second PDU session is temporarily prohibited, and
   setting a change status associated with the first PDU session to indicate that a PSA change or handover for the first PDU session is allowed further comprises setting a change status associated with the second PDU session to indicate that a PSA change or handover for the second PDU session is allowed.

16. The method of claim 13, wherein the node for maintaining PSA change or handover status for PDU sessions comprises a synchronization database function for maintaining change status variables that indicate PSA change or handover status for PDU sessions.

17. A method for coordinated change of Protocol Data Unit (PDU) Session Anchors (PSAs), the method comprising:
   at a first node being associated with a first PDU session:
      determining that a handover is needed for the first PDU session having a first PSA, where the first PDU session and a second PDU session are redundant PDU sessions with each other;
      determining whether the handover for the first PDU session is temporarily prohibited;
      upon a determination that the handover for the first PDU session is temporarily prohibited, postponing the handover for the first PDU session; and
      upon a determination that the handover for the first PDU session is not temporarily prohibited:
         setting the change status associated with the first PDU session to indicate that a PSA change or handover for the first PDU session is temporarily prohibited;
         performing the handover for the second PDU session; and
         setting the change status associated with the first PDU session to indicate that a PSA change or handover is allowed,
      wherein determining that a PSA change or handover for the first PDU session is temporarily prohibited comprises at least one of: determining that the first PDU session is currently undergoing a PSA change; determining that the second PDU session is currently undergoing a PSA change; and determining that the second PDU session is currently undergoing a handover.

18. The method of claim 17, wherein the first node being associated with the first PDU session comprises a Radio Access Network (RAN) node; wherein optionally the RAN node comprises a New Radio Base Station (gNB).

19. The method of claim 17, wherein a second node being associated with the second PDU session comprises a RAN node; wherein optionally the RAN node comprises a gNB.

20. A network node for coordinated change of Protocol Data Unit (PDU) Session Anchors (PSAs), the network node comprising processing circuitry that performs method of claim 1; wherein the network node comprises a core network node or Radio Access network (RAN) node; wherein the core network node comprises a Session Management Function (SMF); and wherein the RAN node comprises a New Radio Base station (gNB).

* * * * *